US010089787B2

(12) United States Patent
Roth

(10) Patent No.: US 10,089,787 B2
(45) Date of Patent: Oct. 2, 2018

(54) SYSTEMS AND METHODS FOR DISPLAYING INFRARED IMAGES

(71) Applicant: FLIR SYSTEMS AB, Taby (SE)

(72) Inventor: Björn Roth, Hägersten (SE)

(73) Assignee: FLIR Systems AB, Taby (SE)

( * ) Notice: Subject to any disclaimer, the term of this patent is extended or adjusted under 35 U.S.C. 154(b) by 339 days.

(21) Appl. No.: 14/582,736

(22) Filed: Dec. 24, 2014

(65) Prior Publication Data
US 2015/0187144 A1 Jul. 2, 2015

Related U.S. Application Data

(60) Provisional application No. 61/921,056, filed on Dec. 26, 2013.

(51) Int. Cl.
G06T 19/00 (2011.01)
(52) U.S. Cl.
CPC .................. G06T 19/006 (2013.01)
(58) Field of Classification Search
None
See application file for complete search history.

(56) References Cited

U.S. PATENT DOCUMENTS 5,506,946 A * 4/1996 Bar ...................... G06T 11/001
345/600
6,072,114 A * 6/2000 Kunimasa ............ G09B 15/023
434/307 A
6,373,490 B1 * 4/2002 Bendiksen ............ G06T 11/001
345/441
6,606,105 B1 * 8/2003 Quartetti ............... G06F 3/0481
715/203
8,126,208 B2 * 2/2012 Steinberg ........... H04N 5/23212
382/103

(Continued)

FOREIGN PATENT DOCUMENTS

EP           0536579 A2 *   4/1993   ......... G06F 3/04883

OTHER PUBLICATIONS

Salem Saleh Al-amri, N.V.Kalyankar, S.D.Khamitkar, Linear and Non-linear Contrast Enhancement Image, 2010, International Journal of Computer Science and Network Security (IJSNS), 10(2):139-143.*

(Continued)

Primary Examiner — Michael J Cobb
(74) Attorney, Agent, or Firm — Haynes and Boone, LLP

(57) ABSTRACT

Methods and computer systems are disclosed for generating an augmented image. For example, a method may include displaying a captured image on a display, wherein the image comprises image data values representing radiation emitted from an observed real world scene, receiving a user indication indicating a local area of interest as a user input signal via an input device, determining a first set of selected pixels in an displayed image representing an local area of interest based on said user input signal, determining a second set of selected pixels representing remaining pixels in said image excluded from said first set of selected pixels, and generating an augmented image by performing a first image processing operation on said first set of selected pixels and/or by performing a second image processing operation on said second set of selected pixels. Other example embodiments are also provided.

20 Claims, 19 Drawing Sheets

(56) References Cited

U.S. PATENT DOCUMENTS

| | | | | |
|---|---|---|---|---|
| 8,655,097 B2* | 2/2014 | Chien | | G06T 5/005 382/261 |
| 2006/0050084 A1* | 3/2006 | Jeffrey | | G06T 5/009 345/617 |
| 2006/0088210 A1* | 4/2006 | Yu | | G06T 5/009 382/167 |
| 2006/0159340 A1* | 7/2006 | Lee | | H04N 1/4074 382/169 |
| 2006/0204054 A1* | 9/2006 | Steinberg | | H04N 5/232 382/118 |
| 2008/0099678 A1* | 5/2008 | Johnson | | G01J 5/02 250/332 |
| 2008/0240578 A1* | 10/2008 | Gudmundson | | G01V 5/0083 382/218 |
| 2009/0044117 A1* | 2/2009 | Vaughan | | G11B 27/034 715/716 |
| 2011/0001809 A1* | 1/2011 | McManus | | G01J 5/02 348/61 |
| 2011/0007964 A1* | 1/2011 | Saund | | G06K 9/00456 382/162 |
| 2011/0043644 A1* | 2/2011 | Munger | | G02B 27/017 348/207.1 |
| 2011/0085738 A1* | 4/2011 | Kitamura | | G06T 5/002 382/199 |
| 2011/0090255 A1* | 4/2011 | Wilson | | G06F 3/04817 345/647 |
| 2013/0009980 A1* | 1/2013 | Gu | | G06T 5/00 345/611 |
| 2013/0114913 A1* | 5/2013 | Nagarajan | | G06F 3/0482 382/306 |
| 2013/0121606 A1* | 5/2013 | Chien | | G06T 5/005 382/260 |
| 2013/0202206 A1* | 8/2013 | Yi | | G06T 5/00 382/170 |
| 2013/0257822 A1* | 10/2013 | Holmgren | | G06F 3/0418 345/178 |
| 2014/0047413 A1* | 2/2014 | Sheive | | H04L 65/403 717/110 |
| 2014/0267426 A1* | 9/2014 | Cook | | G06T 11/60 345/642 |
| 2016/0165233 A1* | 6/2016 | Liu | | G06T 11/60 382/251 |

OTHER PUBLICATIONS

NASA, The Electromagnetic Spectrum, Mar. 2013, retrieved from <<https://imagine.gsfc.nasa.gov/science/toolbox/emspectruml.html>>, Accessed Jan. 5, 2016.*

Tyler Denis, Superimpose a Car onto another Image in Photoshop, 2011, retrieved from <<http://designinstruct.com/digital-art/photo-manipulation/superimpose-a-car-onto-another-image-in-photoshop/>> Accessed Apr. 2, 2015.*

Michael Wooldridge, Chapter 8: Working with Layers, 2009, Teach Yourself Visually Adobe Photoshop CS4, Chapter 8, pp. 168-199, ISBN: 9780470339473.*

* cited by examiner

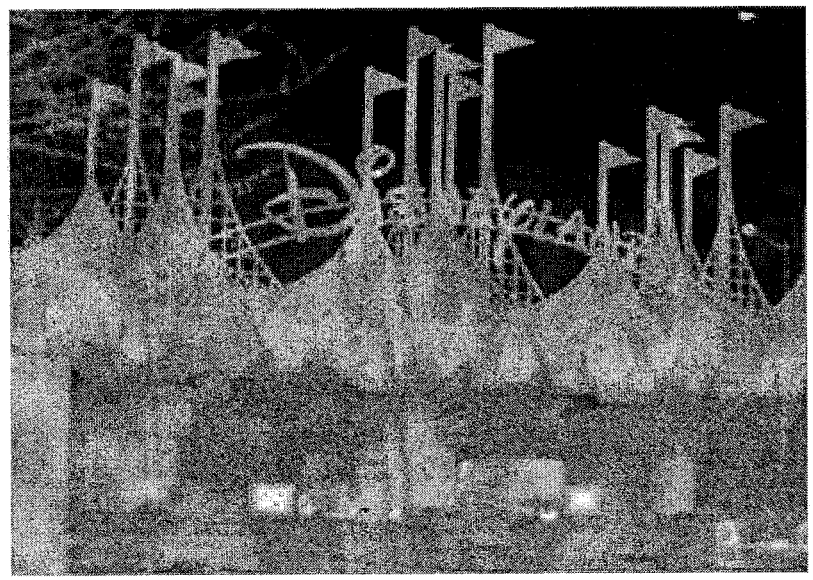
Figure 16a
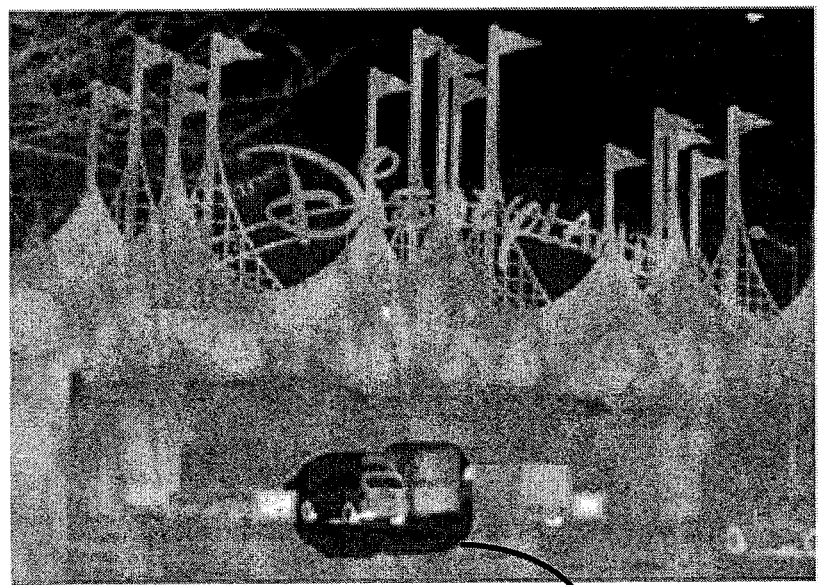
Figure 16b  —1602

SYSTEMS AND METHODS FOR DISPLAYING INFRARED IMAGES

CROSS REFERENCE TO RELATED APPLICATION

This application claims priority to and the benefit of U.S. Provisional Patent Application No. 61/921,056 filed Dec. 26, 2013 and entitled "AUGMENTED IMAGE GENERATION," which is hereby incorporated by reference in its entirety.

TECHNICAL FIELD

Generally, embodiments of the invention relate to the technical field of displaying captured image data values, representing radiation emitted from an observed real world scene, on a display.

More specifically, different embodiments of the present disclosure relate to generation of an augmented image for enhanced display of a local area of interest in a displayed image, e.g. an infrared (IR) image, in particular enhanced with regards to interpretability when analyzing the image.

BACKGROUND

Images of scenes are often useful for monitoring, inspection and/or maintenance purposes, in particular thermal, or infrared (IR) images and associated image layers.

Typically, an infrared imaging system, e.g. in the form of a thermography arrangement or an infrared IR camera, is provided to capture infrared (IR) image data values, representing infrared radiation emitted from an observed real world scene. The captured IR image can after capturing be displayed and analyzed on a display, either in a computer system, such as a thermography arrangement or an infrared IR camera, or in a computing device such as a tablet computer, a laptop or a desktop computer.

As infrared radiation is not visible to the human eye there are no natural relation between the captured infrared (IR) image data values of each pixel in an IR image and colors of a visual representation of the IR image displayed on a display. Therefore, an information visualization process referred to as false coloring or pseudo coloring is used to map captured infrared (IR) image data values of each pixel in an IR image to colors displayed on a display.

When the user analyzing a displayed IR image changes his focus between different areas of interest in the IR image, the mapping to representing colors typically have to be changed in order to visualize features in a particular area in an optimal way, e.g. to achieve sufficient contrast in that particular local area of the displayed IR image. As the mapping is changed for the entire image features visualized in other local areas of the IR image might be less clear after the mapping has changed.

A problem in conventional systems and methods is that a local area of interest in an image may not be analyzed and visualized in an optimal way while simultaneously analyzing the remaining image, in particular when analyzing IR images.

A further problem in conventional systems and methods is that the process of indicating a local area of interest in an image is cumbersome, in particular when performing image analysis in handheld units.

There is therefore a need for new methods for improving display or visualization of local areas of interest in a displayed image, in particular enhanced with regards to contrast of an IR image visualized using false coloring.

SUMMARY

Various techniques are provided for systems and methods of generating an augmented image for enhanced display of a local area in a displayed image by allowing a user to make a user indication that may be converted to a user input signal via an input device, e.g. by rubbing a finger, marking, scratching, lassoing or other user indication methods.

In one embodiment, a method includes displaying an image on a display, wherein the image comprises image data values representing radiation emitted from an observed real world scene; receiving, as a user input signal via an input device, a user indication indicating a local area of interest in the displayed image; determining a first set of selected pixels representing the local area of interest in the displayed image based on said user input signal; determining a second set of selected pixels representing remaining pixels in said image that are excluded from said first set of selected pixels; and generating an augmented image by performing a first image processing operation on said first set of selected pixels and/or performing a second image processing operation on said second set of selected pixels.

In another embodiment, a computer system includes a processor; at least one memory configured to store data values or parameters received from the processor or to retrieve and send data values or parameters to the processor; a display configured to receive a signal from the processor, display an image in response to the received signal, receive input from a user by touch screen functionality, and send a user input signal to said processor in response to the input from the user; and wherein the processor is configured to send the signal to the display to display the image, wherein the image comprises image data values representing radiation emitted from an observed real world scene, receive, as the user input signal from the display, a user indication indicating a local area of interest in the displayed image, determine a first set of selected pixels representing the local area of interest in the displayed image based on said user input signal, determine a second set of selected pixels representing remaining pixels in said image that are excluded from said first set of selected pixels, and generate an augmented image by performing a first image processing operation on said first set of selected pixels and/or performing a second image processing operation on said second set of selected pixels.

In yet another embodiment, a non-transitory computer-readable medium stores computer-readable instructions which, when executed by a processor of a computer system, cause the computer system to perform a method comprising displaying an image on a display, wherein the image comprises image data values representing radiation emitted from an observed real world scene; receiving, as a user input signal via an input device, a user indication indicating a local area of interest in the displayed image; determining a first set of selected pixels representing the local area of interest in the displayed image based on said user input signal; determining a second set of selected pixels representing remaining pixels in said image that are excluded from said first set of selected pixels; and generating an augmented image by performing a first image processing operation on said first set of selected pixels and/or performing a second image processing operation on said second set of selected pixels.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

The present invention will be further explained by means of exemplifying embodiments and with reference to the accompanying claims, in which:

FIG. 16a shows an example visual representation of IR image data values comprised in a captured infrared (IR) image in accordance with an embodiment of the present disclosure.

FIG. 16b shows an example visual representation of IR image data values comprised in a captured infrared (IR) image wherein the visual representation has a local area of interest with enhanced contrast, in accordance with an embodiment of the present disclosure.

Embodiments of the invention and their advantages are best understood by referring to the detailed description that follows. It should be appreciated that like reference numerals are used to identify like elements illustrated in one or more of the figures.

DETAILED DESCRIPTION

Introduction

Figure 1:
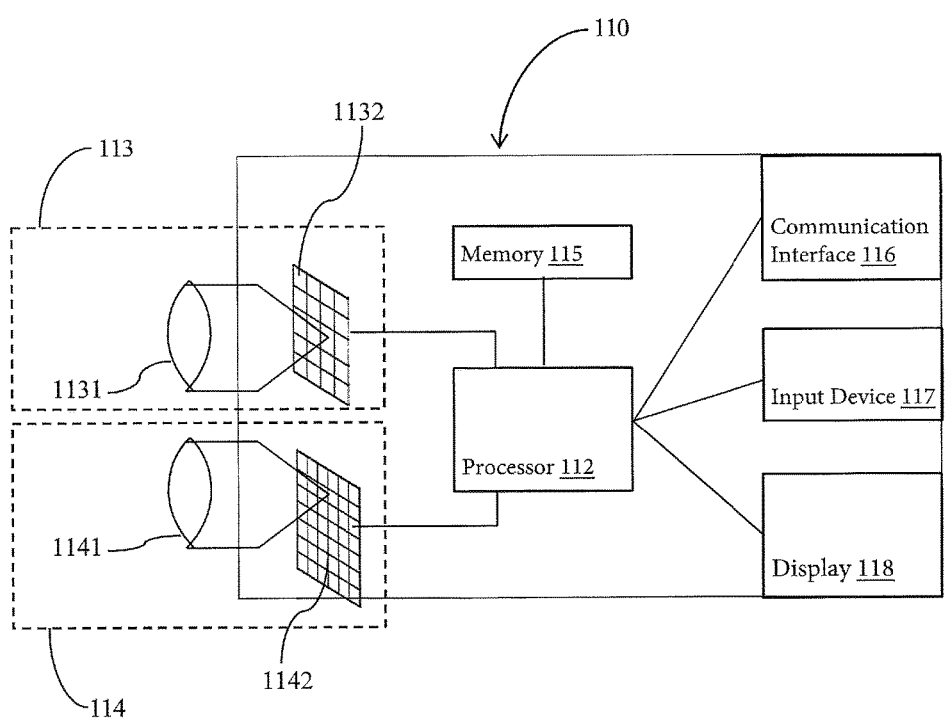
FIG. 1 shows a schematic view of a computer system in accordance with one or more embodiments of the present disclosure.

Cameras are often used in various applications such as surveillance and inspection or monitoring of various objects (e.g., buildings). In particular, thermography arrangements or IR cameras comprising an IR imaging system may be utilized to capture IR image data values that represent infrared radiation emitted from an observed real world scene. As known in the art, IR cameras with an IR imaging system generally employ a lens working with a corresponding infrared IR detector to provide an image of a view of an observed real world scene. The operation of such cameras is generally as follows. Infrared energy is accepted via infrared optics, including the lens, and directed onto the IR detector elements. Each detector element responds to the infrared radiation or heat energy received. A frame of IR image data values may, for example, be captured by scanning all the rows and columns of a detector and, in some embodiments, analog to digital converted to obtain a captured IR image wherein IR image data values associated with each detector element is referred to as an IR image pixel in the IR image, having an associated row and column index.

Various techniques are disclosed for a method and a system to process and display an image, e.g. a captured IR image comprising infrared (IR) image data values representing infrared radiation emitted from an observed real world scene, on a display. More specifically, various embodiments of the disclosure may provide an enhanced display of a local area of interest in a displayed image, such as an IR image, enhanced with regards to, for example, contrast.

Calibration

Certain characteristics of IR radiation sensors cause measurement errors. Individual detector elements have unique response characteristics. These response characteristics are found to produce non-uniformities, which result in noise. Additionally, heat generated internally by the IR imaging system and the environment surrounding the IR imaging system causes temperature drifts which cause offsets in the captured infrared data compared with infrared data emitted from the observed real world scene. Many infrared cameras have functionality to correct for such non-uniformities and temperature drifts.

In one or more embodiments, such functionality may be referred to herein as IR temperature calibration. For example, some infrared cameras can perform offset compensation/IR temperature calibration automatically or manually, which corrects for such non-uniformities and temperature drifts by observing a uniform IR or thermal scene. More specifically for one example, performing non-uniformity and/or temperature drift correction may include placing a shutter between the optics and the detector elements, measuring offset correction data for each detector element which provides the desired uniform output response, and obtaining a reading of the surrounding environment (e.g., measuring the ambient temperature). These measured non-uniformities offset corrections values and temperature drift offset correction values, herein referred to as IR temperature calibration data parameters, may be stored and later applied in subsequent infrared measurements, when analyzing or interpreting the IR image data values (also referred to as IR image values) to correct for the measurement errors described above.

Visual Light Imaging System

In one or more embodiments, said thermography arrangements or IR cameras may further comprise a visible light (VL) imaging system configured to capture VL image data values that represent VL radiation emitted or reflected from said observed real world scene. Visible light (VL) may also be referred to as visual light (VL). The VL image data values may be captured substantially simultaneously with said IR image.

The captured IR image, the captured VL image or a combined IR/VL image can after capturing be displayed on a display, either in a computer system, such as a thermography arrangements or IR cameras, or in a computing device such as a tablet computer, a laptop or a desktop computer in order to enable a user to analyze the result.

Image

An image should in this document be understood as a single layer or multi-layer image, wherein the layer or layers comprise image data values that represent a selection of currently captured or previously captured and saved radiation emitted from an observed real world scene, a combined image, a VL/IR contrast enhanced combined image, a distance map, a blueprint, a sketch, or other information associated with an observed real world scene.

The currently captured or previously captured and saved radiation emitted from an observed real world scene may be electromagnetic radiation in infrared and/or non-thermal wavelengths. For example, an image or a layer of a multi-layer image may be associated with infrared radiation (e.g., including thermal infrared radiation) captured by an IR imaging system. In another example, an image or a layer of a multi-layer image may be associated with non-thermal radiation (e.g., visible light, near-infrared (NIR) light, short wave infrared (SWIR) light, ultra-violet (UV) light, or other non-thermal radiation) captured by a VL or non-thermal imaging system.

Image data values may be captured, retrieved from memory or calculated based on image data values from other layers in an image.

According to various embodiments, a file format is provided which may allow image data values from a single or multiple layers to be stored within the same file. Optionally, the file format may be adapted to enable inclusion of additional information parameters relating to the image data values, time stamps representing the time of capture of the respective image data, and parameters regarding stabilization and/or alignment of image data values between layers.

A file according to such a file format may comprise image data values and possibly one or more additional information parameters, according to various embodiments. When a user uses specific purpose software to open such a file, the user will be presented with a single layer or predetermined combination of image data values from different layers according to settings of computer system used to capture the images and/or settings of the specific purpose software used to open the file. Thereafter, the user is able to modify the view by using any of one or more interaction tools, which may, for example, be graphically represented by icons or the like in a graphical user interface provided by the specific purpose software. The user is able to use the one or more interaction tools by using input and/or interaction functionality, comprising a selection of one or more input devices for inputting commands and/or control signals, such as an interactive display, e.g. a touch or pressure sensitive display, a joystick, a mouse, a keyboard and/or record/push-buttons.

Displaying an Image

VL imaging systems generally may generate VL images from sensors elements integrated with red, green and blue filters, thereby obtaining VL image data values corresponding to color. The same color may later be used to obtain a visual representation of the VL image. IR imaging systems generally generate IR images from sensor elements detecting infrared radiation energy intensity. As infrared radiation energy intensity is not visible to the human eye there are no natural relation between the captured infrared (IR) image's data values of each pixel in an IR image and greyscale or colors displayed on a display. Therefore an information visualization process referred to as false coloring or pseudo coloring is used to map captured infrared (IR) image data values of each pixel in an IR image to a finite set of color or grey-scale representations selected from a color model in a palette, used to generate a visual representation for the corresponding pixel displayed on a display. A palette is typically a finite set of color or grey-scale representations selected from a color model with associated palette index values for the display of images or generation of visual representations of images, such as IR images, i.e. a pre-defined palette represents a finite set of grayscale or color values of a color model displayable on a display thereby making it visible to the human eye. Mapping of captured infrared (IR) image data values of each pixel in an IR image to a palette used to present the corresponding pixel of a visual representation of said IR image displayed on a display is typically performed by applying a pre-determined relation, wherein said pre-determined relation describes a mapping from infrared image data values to said finite set of color or grey-scale representations selected from a color model in a pre-defined palette, e.g. a palette index value with an associated color or grey-scale representation selected from a color model. A captured IR image is typically displayed to an intended user based on the captured IR image comprising infrared (IR) image data values, IR temperature calibration data parameters, a predefined palette representing a finite set of grayscale or color values of a color model displayable on a display and a pre-determined relation describing a mapping from infrared image data values to said pre-defined palette. As thermal images by nature are generally low contrast and noisy, the captured IR image may further be subjected to various imaging processing in to improve the interpretability of the image before displaying it to a user. Examples of such image processing is correction with IR temperature calibration data parameters, low pass filtering, registration of multiple successive IR images and averaging to obtain a averaged IR image or any other IR image processing operation known to a person skilled in the art.

Figure 3:
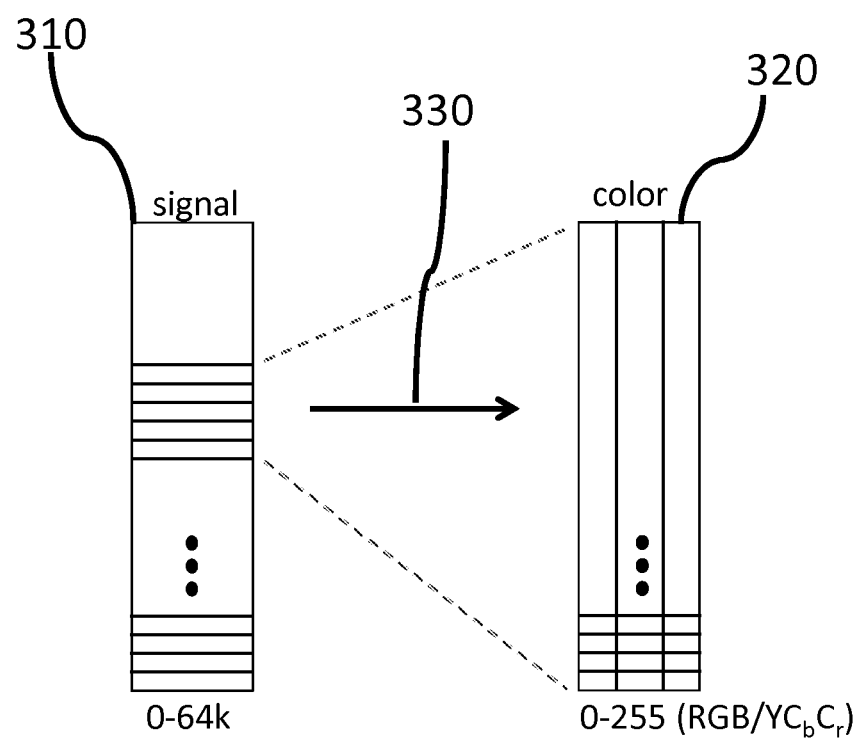
FIG. 3 illustrates how an augmented image is generated based on a pre-determined relationship, according to an embodiment of a computer-implemented method of the present disclosure.
Figure 4:
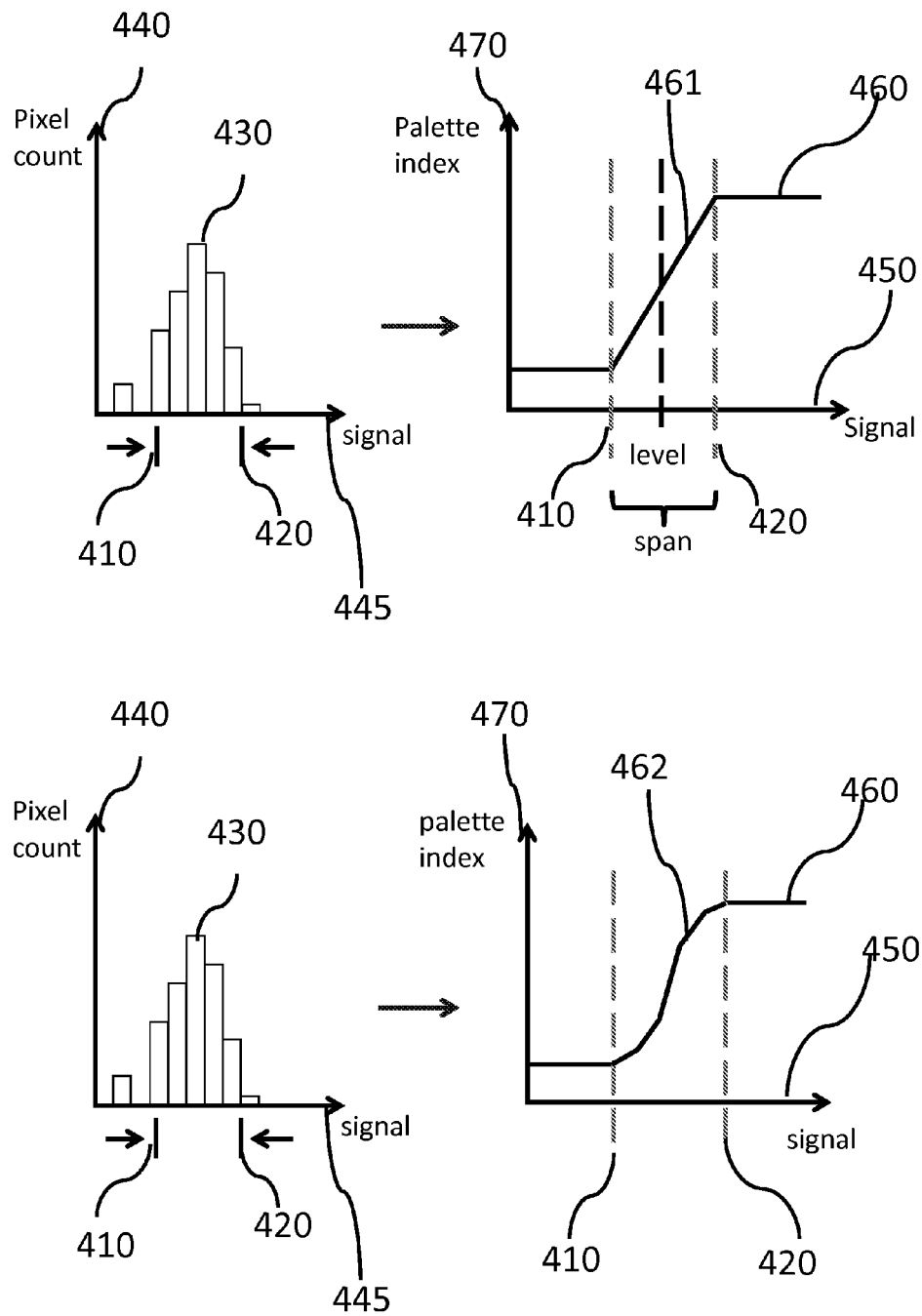
FIG. 4 illustrates how an augmented image is generated based on a pre-determined relationship derived or determined based on captured image data values, according to an embodiment of a computer-implemented method of the present disclosure.

FIG. 3 shows an example illustrating how an augmented image may be generated based on a pre-determined relationship 330 describing a mapping from infrared image data values 310, also referred to as signal values in an IR image to a finite set of color or grey-scale representations selected from a color model in a pre-defined palette 320, in accordance with an embodiment of the disclosure. Mapping of captured infrared (IR) image data values 310, of each pixel in an IR image, to a palette 320, used to present the corresponding pixel of a visual representation of said IR image displayed on a display is typically performed by applying a pre-determined relation 330. Said pre-determined relation describes a mapping from infrared image data values to said finite set of color or grey-scale representations selected from a color model in a pre-defined palette, e.g. from captured infrared (IR) image data values to a palette index value with an associated color or grey-scale representation selected from a color model FIG. 4 shows graphs illustrating how a pre-determined relation may be derived or determined based on captured IR image data values, according to an embodiment of a method of the disclosure. In one or more embodiments, a pre-determined relation may be determined by generating a histogram 430 based on IR image data values of a set of selected pixels in an IR image, wherein the histogram typically describes the count or number of pixels in the image with a particular IR image data value within a predefined value range, also referred to as a bin, typically represented in a diagram of a histogram as predefined value ranges or bins on a horizontal axis 445 and the count of or number of pixels in the predefined value range on a vertical axis 440. In one or more embodiments, the method further comprises determining minimum 410/maximum 420 IR image data values for which the pre-determined relation is applied, also referred to as color span, wherein the determination is based on said generated histogram. In an example, this can be performed through tail rejection, as would be understood by a person skilled in the art.

In one or more embodiments, the method further comprises determining a second pre-determined relation 460 based on said generated histogram and said determined minimum/maximum IR image data values. In one or more embodiments, the pre-determined relation is determined as a linear 461 or non-linear 462 relation dependent of IR image data values, said minimum/maximum IR image data values or span 410, 420 and optionally the count of or number of pixels in the predefined value range. The second pre-determined relation 460 typically describes a mapping to palette index values, with an associated color or grey-scale representation selected from a color model, on the y-axis 470 from a predefined value range or bin on the horizontal axis 450. In one example, all IR image data values in an IR image within a particular predefined value range or bin within said minimum 410/maximum 420 IR image data values will be mapped to a particular palette index value based on the second pre-determined relation 460, wherein particular palette index value is associated to color or grey-scale representation selected from a color model. The particular palette index value may then be used for generating a visual representation of the IR image and optionally displayed on a display to a user. In a non-limiting example embodiment, said non-linear relation is one of an exponential relation dependent on said IR image data values or a sinusoidal relation dependent on said IR image data values.
Analyzing The mapping of captured infrared (IR) image data values of each pixel in an IR image to representations of pixels in a visual representation of the IR image, displayed on a display to the user, is typically performed via predefined function derived or determined based on IR image data values from the entire IR image resulting in a trade-off with regards to sufficiently optimal displayed contrast for different local areas of interest in the IR image, wherein local areas of interest refers to spatially separated subsets of pixels in the IR image.

In prior art contrast of local areas would typically be improved by manually altering the minimum/maximum temperature value for which the pre-determined relation is applied, also referred to as color span with an associated color level, manually selecting a high-contrast pre-determined palette, or manually selecting an isotherm pre-determined relation and palette, i.e. mapping each unique IR image data value to a unique color in an isotherm palette.

The prior art methods has the disadvantage that some IR image data values and associated pixels would not be mapped to the palette and reduces the efficiency of deriving a pre-determined relation describing a mapping from infrared image data values to said pre-defined palette, e.g. when using histogram equalization, high contrast palettes generate "busy" images that are hard to interpret. The prior art methods further has the disadvantage that they will not work well if the spread between minimum and maximum value in the IR image is large and result in reduced contrast overall. The prior art methods further has the disadvantage that analyzing the image will be less intuitive or even confusing as the entire presentation or display of the image changes when the user changes focus from one local area of the IR image to another.

In contrast, methods and arrangements disclosed herein advantageously allow the user to indicate a local area of interest in an image in an intuitive way, and to perform a first image processing operation on the local area of interest and perform a second image processing operation on remaining areas, e.g. to increase contrast for local areas of the image whilst maintaining the setting for the remaining image.

In one or more embodiments, a method comprises:
displaying a captured image on a display, wherein the image comprises image data values representing radiation emitted from an observed real world scene;
receiving a user indication indicating a local area of interest as a user input signal via an input device;
determining a first set of selected pixels in an displayed image representing an local area of interest based on said user input signal;
determining a second set of selected pixels representing remaining pixels in said image excluded from said first set of selected pixels;
performing a first image processing operation on said first set of selected pixels; and performing a second image processing operation on said second set of selected pixels.
System Architecture
Computer System FIG. 1 shows a schematic view of one or more embodiments of a computer system no, e.g. in the form of a thermography arrangement, an infrared IR camera, a tablet computer, a laptop, PDA, smartphone, mobile phone, cellular communications device or a desktop computer. In one or more embodiments the computer system is configured to capture infrared (IR) image data values, representing infrared radiation emitted from an observed real world scene by an infrared (IR) imaging system 113. Said IR imaging system comprises an infrared (IR) optical system 1131, e.g. comprising a lens, zoom functionality and focus functionality, together with a corresponding infrared IR detector 1132, for example comprising a micro-bolometer focal plane array, arranged to provide an IR image in the form of a signal frame of IR image data values, representing infrared radiation emitted from an observed real world scene. The infrared (IR) imaging system 113 is further arranged to send the signal frame of IR image data values to a processor 112.

In one or more embodiments, the computer system no further comprises the processor/processing unit 112 provided with specifically designed programming or program code portions adapted to control the processing unit to perform the steps and functions of embodiments of the inventive method described herein. The computer system 110 further comprises at least one memory 115 configured to store data values or parameters received from the processor 112 or to retrieve and send data values or parameters to the processor 112. In one or more embodiments the computer system no further comprises a display 118 configured to receive a signal from a processor 112 and to display the received signal as a displayed image, e.g. to a user of the computer system no. In one or more embodiments the computer system no further comprises an input device 117 configured to receive input or indications from a user, e.g. a user to indicate a local area of interest in an IR image. In one exemplary embodiment the display 118 is integrated with a user input device 117 configured to receive a signal from a processor 112 and to display the received signal as a displayed image and receive input or indications from a user, e.g. by applying touch screen functionality and to send a user input signal to said processor/processing unit 112. In one or more embodiments, the computer system no further comprises a communications interface 116 configured to send or receive data values or parameters to/from a processor 112 to/from external units via the communications interface 116. In one or more embodiments, said external unit may be a computing device 230 of FIG. 2.

In one or more embodiments, said processor/processing unit 112 is communicatively coupled to said memory 115, said communications interface 116, said input device 117, said display 118 and optionally said IR imaging system 113 and/or a VL imaging system.

In one or more embodiments, wherein said IR imaging system 113 comprised in said computer system no is configured to capture multiple consecutive IR images as a stream of IR images, such as a video with a given frame rate.

An exemplary embodiment of the operation of such a computer system no, such as an IR camera, is generally as follows: Infrared energy is accepted via said infrared optical system 1131 and directed onto the IR detector elements 1132. Each detector element responds to the infrared radiation or heat energy received. A frame of infrared (IR) image data values may, for example, be captured by scanning all the rows and columns of the detector and, in some embodiments, analog to digital converted to obtain a captured IR image wherein data values associated to each detector element is referred to as an IR image pixel having an associated row and column index.

In one or more embodiments, the computer system 110 further comprises a visible light (VL) imaging system 114 that is configured to capture visible light (VL) image data values, representing VL emitted or reflected from an observed real world scene. Said VL imaging system 114 may employ a VL optical system 1141, e.g. comprising a lens, zoom functionality and focus functionality together with a corresponding infrared VL detector 1142, for example comprising a digital charge-coupled device (CCD) or complementary metal-oxide-semiconductor (CMOS) active pixel sensors, to provide an VL image in the form of a signal frame of VL image data values, representing VL emitted from an observed real world scene. The VL imaging system 114 is further arranged to send the signal frame of VL image data values to a processor 112.

In one or more embodiments, the VL imaging system 114 may be adapted to capture electromagnetic radiation in other non-thermal wavelengths in addition to or in place of visible light wavelengths. For example, the VL imaging system 114 may be configured to capture near-infrared (NIR) light, short wave infrared (SWIR) light, ultra-violet (UV) light, or other non-thermal light in addition to or in place of visible light. For such embodiments, the VL imaging system 114 may represent a non-thermal imaging system comprising a non-thermal optical system (represented by the VL optical system 1141) and a non-thermal detector (represented by the VL detector 1142) responsive to non-thermal radiation. For example, electron multiplying CCD (EMCCD) sensors, scientific CMOS (sCMOS) sensors, intensified charge-coupled device (ICCD) sensors, as well as CCD-based and CMOS-based sensors discussed above and/or other suitable sensors, may be used to implement the non-thermal detector (represented by the VL detector 1142) to detect NIR light, SWIR light, and/or other non-thermal light.

In one or more embodiments, the computer system no further is adapted to be a handheld type computer system 110 or a fixed mounted monitoring type computer system 110.

In one or more embodiments, the computer system no is configured as one device in which the IR imaging system 113 and the VL imaging system 114 are integrated.

In one or more embodiments, the computer system no is configured as two physically separate devices, i.e. a first device comprising a IR imaging system 113 and second device comprising a VL imaging system 114, communicatively coupled and depicting, or capturing, substantially the same observed real world scene. The memory 115 may be integrated into either one or the first or second device or the memory 115 may be integrated in a physically separate memory device, not shown in the figure, to which said first and second device is communicatively coupled.

In one or more embodiments, the computer system no is configured to capture infrared (IR) image data values, representing infrared radiation emitted from an observed real world scene and then further to correct or calibrate captured data values by applying pre-determined IR temperature calibration data parameters, to map and scale the captured data values for display as an IR, or thermal, image, singly or combined with a VL image, according to methods known in the art.

In one or more embodiments the IR imaging system 113 comprised in the computer system no is further arranged to send the signal frame of IR image data values to a processor 112 intermediate storing in a memory comprised in or separate from the computer system no.

In one or more embodiments, wherein an external IR imaging system is arranged to send a signal frame of IR image data values to a processor 112 via said communications interface 116.

In one or more embodiments the IR imaging system 113 comprised in the computer system no is further arranged to send the signal frame of IR image data values to an external processor/processing unit (not shown in FIG. 1) from said intermediate storing via said communications interface 116.

In one or more embodiments the processor/processing unit 112 comprised in the computer system no is further arranged to send the received IR image as a signal frame of IR image data values to an external processor/processing unit (not shown in FIG. 1) directly or from said intermediate storing via said communications interface 116.

In one or more embodiments the processor/processing unit 112 comprised in the computer system no is further arranged to receive an IR image as a signal frame of IR image data values from an external IR imaging system (not shown in FIG. 1) via said communications interface 116.

In one or more embodiments the processor/processing unit 112 may be a processor such as a general or specific purpose processor/processing unit for example a microprocessor, microcontroller or other control logic that comprises sections of code or code portions, stored on a computer readable storage medium, such as a memory 115, that are fixed to perform certain tasks but also other alterable sections of code, stored on a computer readable storage medium, that can be altered during use. Such alterable sections of code can comprise parameters that are to be used as input for the various tasks, such as the calibration of the computer system no, adaption of the sample rate or the filter for the spatial filtering of the images, or any other parameter related operations known to a person skilled in the art and applied without inventive skill.

In one or more embodiments, the processor/processing unit 112 is configurable using a hardware description language (HDL).

In one or more embodiments, the processor/processing unit 112 is a Field-programmable gate array (FPGA), i.e. an integrated circuit designed to be configured by the customer or designer after manufacturing and configurable using a hardware description language (HDL). For this purpose, embodiments of the invention comprise configuration data configured to control an FPGA to perform the steps and functions of the method embodiments described herein.

In one or more embodiments, said communications interface 116 may comprise a selection of serial wired communication, Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, Wireless-MAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX), infrared communication and ultrasonic communication, etc., but is not limited thereto.

In this document, the terms "computer program product" and "computer-readable storage medium" may be used generally to refer to media such as the memory 115 or the storage medium of processing unit 112 or an external storage medium. These and other forms of computer-readable storage media may be used to provide instructions to processing unit 112 for execution. Such instructions, generally referred to as "computer program code" (which may be grouped in the form of computer programs or other groupings), when executed, enable the computer system 110, e.g. a thermal imaging device, to perform features or functions of embodiments of the current technology. Further, as used herein, "logic" may include hardware, software, firmware, or a combination of thereof.

In one or more embodiments, the processor/processing unit 112 is communicatively coupled and communicates with the memory 115 where parameters are kept ready for use by the processing unit 112, and where the images being processed by the processing unit 112 can be stored if the user desires. The one or more memories 115 may comprise a selection of a hard RAM, disk drive, a floppy disk drive, a magnetic tape drive, an optical disk drive, a CD or DVD drive (R or RW), or other removable or fixed media drive.

External Processor/Processing Unit

Figure 2:
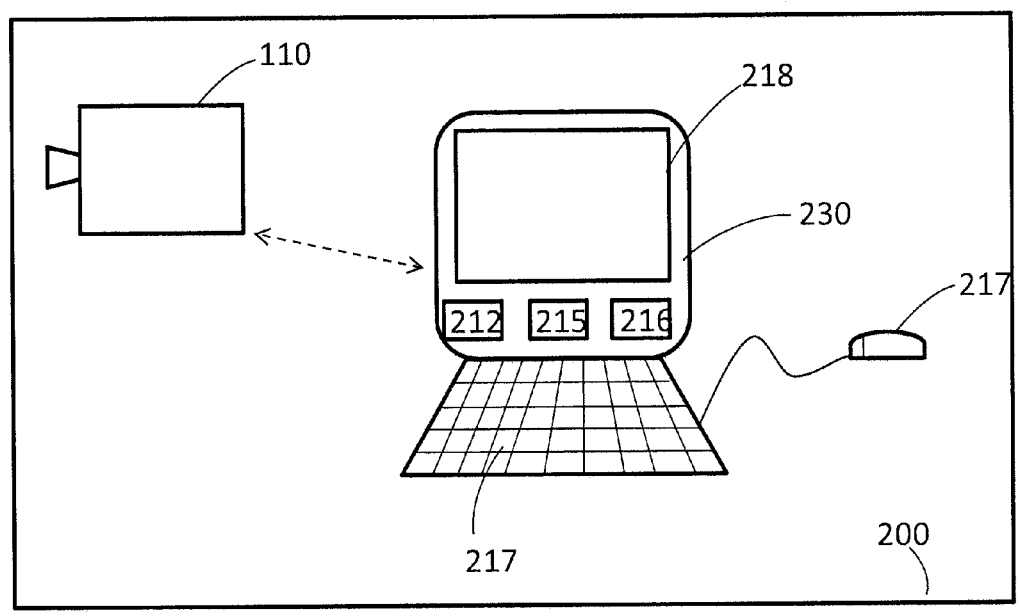
FIG. 2 shows a schematic view of the computer system in accordance with one or more alternative embodiments of the present disclosure.

FIG. 2 is a schematic view of a system 200 wherein the processor/processing unit 112 comprised in the computer system 110, such as a thermography arrangement or an infrared IR camera, is further arranged to send the received IR image as a signal frame of IR image data values to an external processor/processing unit 212, wherein said external processor/processing unit 212 is comprised in a computing device 230 such as a tablet computer, a laptop, PDA, smartphone, mobile phone, cellular communications device or a desktop computer, in accordance with one or more embodiments of the disclosure. Said external processor/processing unit 212 is further arranged to receive said IR image as a signal frame of IR image data values via an communication interface 216, e.g. from processor/processing unit 112. The external processor/processing unit 212 is provided with specifically designed programming or program code portions adapted to control the processing unit to perform the steps and functions of embodiments of the inventive method described herein. The computing device 230 further comprises a user input device 217 configured to receive input or indications from a user and a display 218 configured to receive a display signal from said external processor/processing unit and to display the received signal as a displayed image, e.g. to a user of the computing device 230. The computing device 230 further comprises at least one memory 215 configured to store data values or parameters received from a processor 212 or to retrieve and send data values or parameters to a processor 212. The computing device 230 further comprises a communications interface configured to send or receive data values or parameters to/from a processor 212 to/from external units, such as said computer system 110, via the communications interface 216.

In one or more embodiments, the display 218 is integrated with a user input device 217 configured to receive input or indications from a user, e.g, by applying touch screen functionality and to send a user input signal to said processor/processing unit 212.

In one or more embodiments, the user input device 217 comprised in or communicatively coupled to said computing device 230 is configured to receive input or indications from a user by applying eye tracking techniques, in manners known per se (e.g., in one or more conventional ways as would be understood by one skilled in the art).

In one or more embodiments, the user input device is configured to enable control functionality of the computing device 230 and/or the computer system 110.

Method Embodiments

When a user, after displaying a visual representation of an image such as an IR image, wishes to focus his attention temporarily on a local area of interest in said visual representation, the user may indicate a local area of interest. The visual representation may then be image-processed and optionally displayed in a manner such that image interpretability is improved, e.g. such that details in the local area are more clearly visible while still displaying the remaining sections of the visual representation as before.

Figure 5:
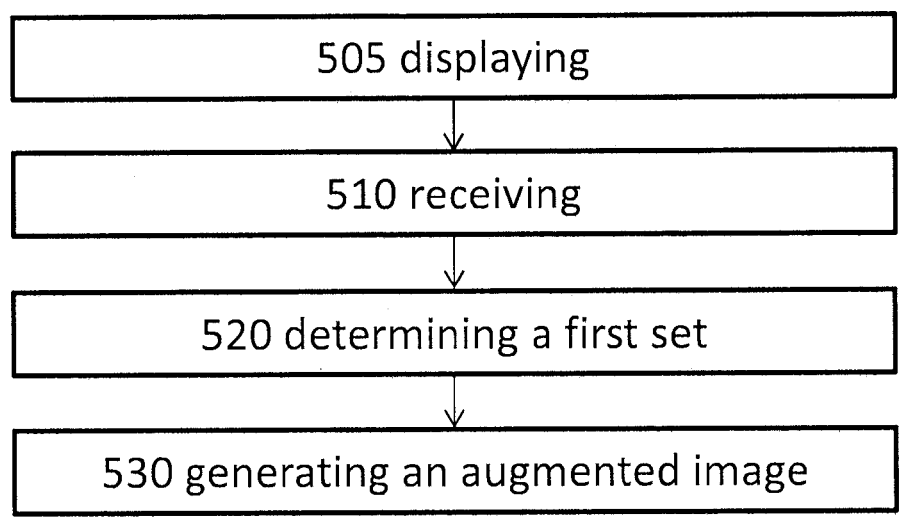
FIG. 5 shows a flowchart of a computer-implemented method for generating an augmented image in accordance with an embodiment of the present disclosure.

FIG. 5 shows a flowchart of a method in a computer system in accordance with an embodiment of the disclosure. The method may comprise:

at block 505, displaying an image on a display, wherein the image comprises image data values representing radiation emitted from an observed real world scene;

at block 510, receiving a user indication indicating a local area of interest as a user input signal via an input device;

at block 520, determining a first set of selected pixels representing a local area of interest in the displayed image based on said user input signal, and determining a second set of selected pixels representing remaining pixels in said image excluded from said first set of selected pixels; and at block 530, generating an augmented image by performing a first image processing operation on said first set of selected pixels and/or performing a second image processing operation on said second set of selected pixels.

In one or more embodiments, the display is a touchscreen. In one non-limiting example, image data values are received by the display as a control signal from a processor, thereby enabling presentation of a visual representation of the image data values on the display.

In one or more embodiments, the image includes an IR image. In one or more embodiments, the image includes a non-thermal image. In one example, the captured non-thermal image is one of visible light, near-infrared (NIR) light, short wave infrared (SWIR) light, ultra-violet (UV) light, or other non-thermal light.

In one or more embodiments, the image includes a multi-layer image, wherein the layer or layers comprise image data values that represent a selection of currently captured or previously captured and saved radiation emitted from an observed real world scene, a combined image, a contrast enhanced combined image, a distance map, a blueprint or sketch, or other information associated with an observed real world scene. In one or more embodiments, the multiple layers may be aligned and associated so that objects represented by a set of pixels in a first layer is represented by the corresponding pixels in a second layer, e.g. a pixel at row 10 and column 10 in a first layer is representing the same object as a pixel at row 10 and column 10 in a second layer.

In one or more embodiments, the first and/or second image processing may comprise selecting image data values from a layer that is different from a current layer. Thus, for example, the local area of interest represented by the selected pixels may be image processed to be displayed as a VL image, combined IR/VL image, or in other form associated with a layer different from an IR image layer.

User Indication

When a user is analyzing a noisy and low contrast image such as an IR image, indicating a local area of interest might be cumbersome as interesting parts might not be visible with the currently performed image processing such as applying a first palette, thereby making it difficult or even impossible to define the outline of a local area of interest. By allowing the user to "scratch" or in other ways indicate with a continuous gesture via said input device, typically via a touchscreen, the area of interest may be continuously increased, e.g. until the continuous gesture is ended.

Figure 6:
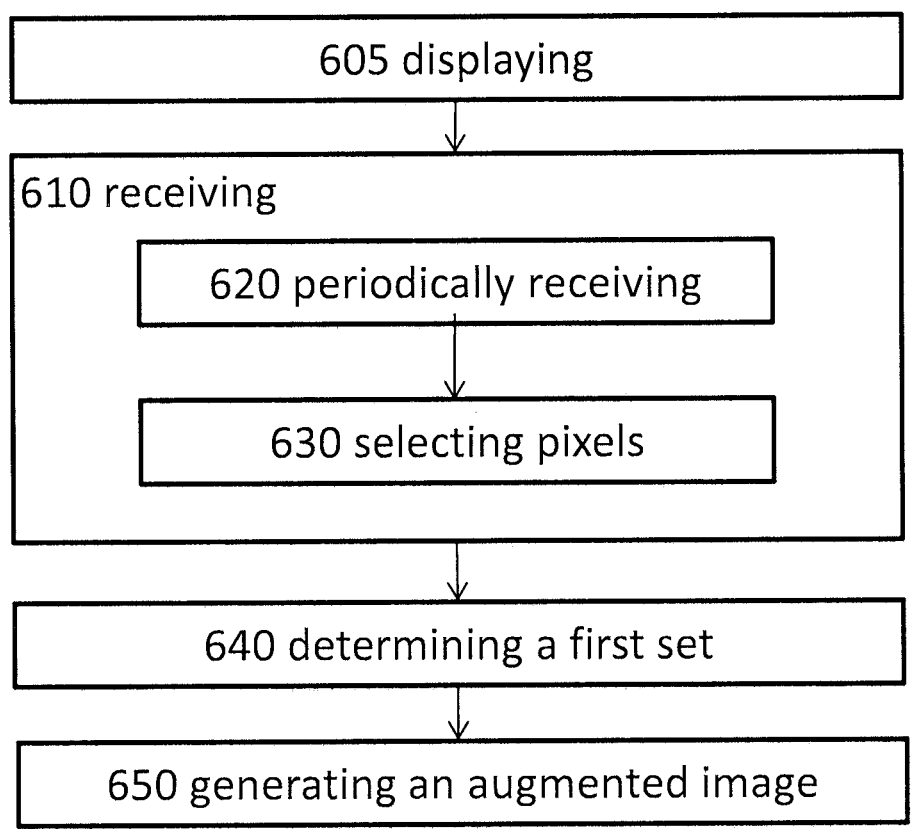
FIG. 6 shows a flowchart of a computer-implemented method for generating an augmented image in accordance with another embodiment of the present disclosure.

FIG. 6 shows a flowchart of another embodiment of the method described in relation to FIG. 5. The method illustrated in FIG. 6 may comprise:

at block 605, displaying an image on a display, wherein the image comprises image data values representing radiation emitted from an observed real world scene;

at block 610, receiving a user indication indicating a local area of interest as a user input signal via an input device;

at block 640, determining a first set of selected pixels representing an local area of interest in the displayed image based on said user input signal, and determining a second set of selected pixels representing remaining pixels in said image excluded from said first set of selected pixels; and at block 650, generating an augmented image by performing a first image processing operation on said first set of selected pixels and/or performing a second image processing operation on said second set of selected pixels, wherein the receiving the user input signal at block 610 further comprises receiving a user indication of a press-and-rub gesture via a touch screen as the user input signal, wherein the method further comprises periodically receiving first data representing a press-and-rub gesture current location at block 620 until it is detected that fourth data representing a press-and-rub gesture ending location is generated, and selecting pixels in said displayed image at block 630 based on said press-and-rub gesture current location.

Figure 7:
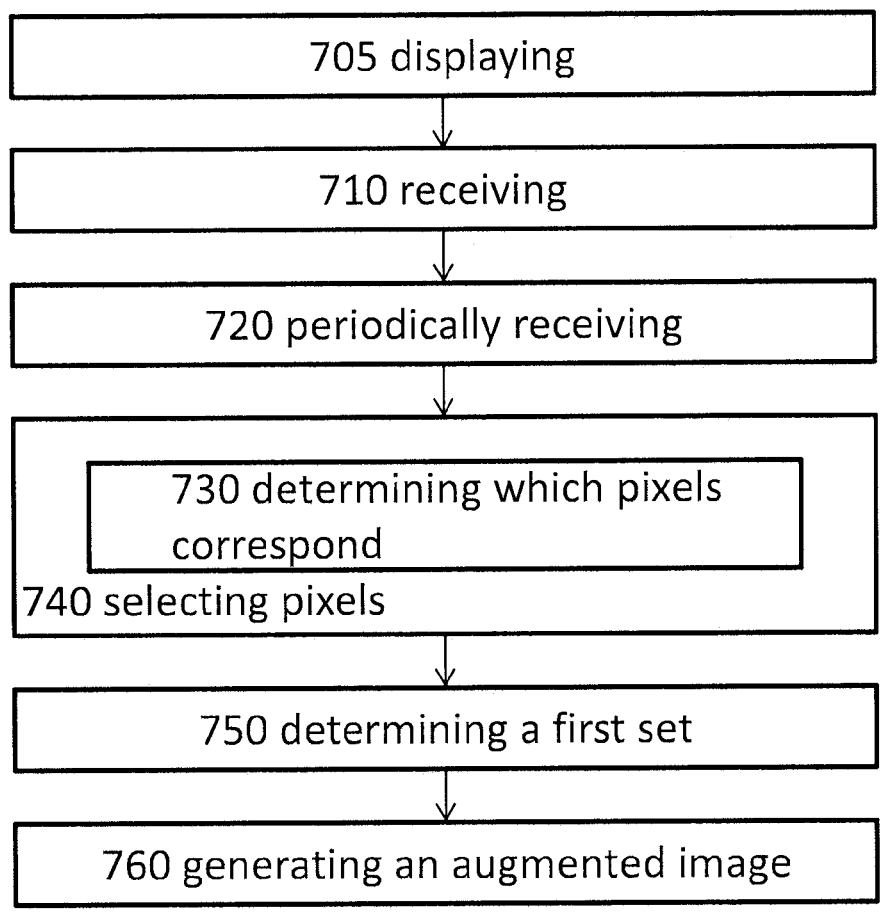
FIG. 7 shows a flowchart of a computer-implemented method for generating an augmented image in accordance with another embodiment of the present disclosure.

FIG. 7 shows a flowchart of another embodiment of the method described in relation to FIG. 6. The method illustrated in FIG. 7 may comprise:

at block 705, displaying an image on a display, wherein the image comprises image data values representing radiation emitted from an observed real world scene;

at block 710, receiving a user indication indicating a local area of interest as a user input signal via an input device;

at block 720, periodically receiving first data representing a press-and-rub gesture current location until it is detected that fourth data representing a press-and-rub gesture ending location is generated;

at block 740, selecting pixels in said displayed image based on said press-and-rub gesture current location;

at block 750, determining a first set of selected pixels representing an local area of interest in the displayed image based on said user input signal, and determining a second set of selected pixels representing remaining pixels in said image excluded from said first set of selected pixels; and at block 760, generating an augmented image by performing a first image processing operation on said first set of selected pixels and/or performing a second image processing operation on said second set of selected pixels, wherein said selecting pixels in said displayed image at block 740 further comprises determining at block 730 which pixels in said displayed image have displayed locations that correspond to said periodically received press-and-rub gesture current locations, and selecting said determined pixels.

In one non limiting example, a touch screen is displaying an image, such as an IR image, and a user makes a press-and-rub gesture by pressing, holding and moving his finger over a local area of interest, whereby the press-and-rub gesture current location is detected by the touchscreen and sent as first data in the form of a user input signal to a processor in the computer system. The processor then determines that the press-and-rub gesture current location corresponds to pixels in the displayed image and selects said corresponding image pixels.

Figure 8:
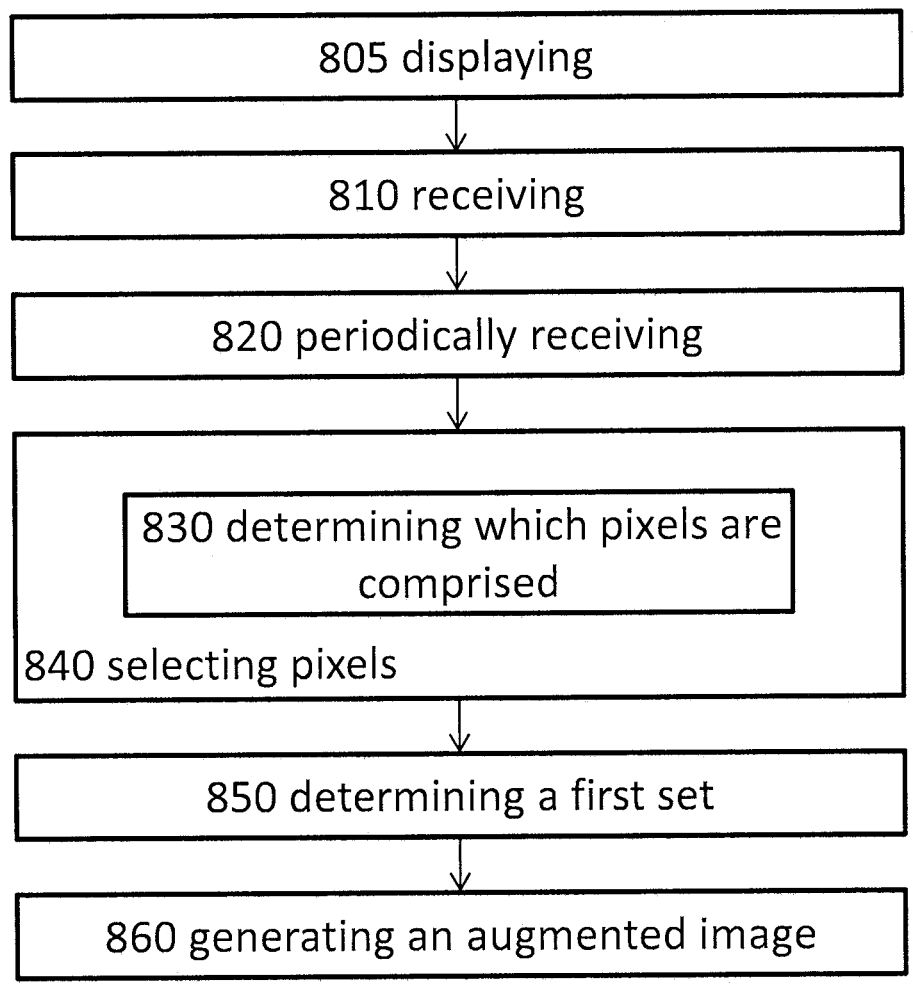
FIG. 8 shows a flowchart of a computer-implemented method for generating an augmented image in accordance with another embodiment of the present disclosure.

FIG. 8 shows a flowchart of another embodiment of the method described in relation to FIG. 6. The method illustrated in FIG. 8 may comprise:

at block 805, displaying an image on a display, wherein the image comprises image data values representing radiation emitted from an observed real world scene;

at block 810, receiving a user indication indicating a local area of interest as a user input signal via an input device;

at block 820, periodically receiving first data representing a press-and-rub gesture current location until it is detected that fourth data representing a press-and-rub gesture ending location is generated;

at block 840, selecting pixels in said displayed image based on said press-and-rub gesture current location;

at block 850, determining a first set of selected pixels representing an local area of interest in an displayed image based on said user input signal, and determining a second set of selected pixels representing remaining pixels in said image excluded from said first set of selected pixels; and at block 860, generating an augmented image by performing a first image processing operation on said first set of selected pixels and/or performing a second image processing operation on said second set of selected pixels, wherein said selecting pixels in said displayed image at block 840 further comprises determining at block 830 which pixels in said displayed image have displayed locations that are comprised by one or more predefined graphical objects each centered on the respective press-and-rub gesture current locations, and selecting said determined pixels.

In one non limiting example, a touch screen is displaying an image, such as an IR image, and a user makes a press-and-rub gesture by pressing, holding and moving his finger over a local area of interest, whereby the press-and-rub gesture current location is detected by the touchscreen and sent as first data in the form of a user input signal to a processor in the computer system. The processor then determines that the predefined graphical object centered on said press-and-rub gesture current location corresponds to pixels in the displayed image and selects said corresponding image pixels, e.g. image pixels within a circle.

In some situations, a user may be analyzing an image, such as an IR image, and indicating a local area of interest where an outline of a local area of interest may be identified with the currently performed image processing, but no details within the outline may be identified. By allowing the user to draw a polygon or closed plane figure, e.g. a circle, triangle or square, pixels enclosed in the polygon or closed plane figure may be selected. Typically, such a polygon is bounded by a finite chain of straight-line segments closing in a loop to form a closed chain or circuit, as would be understood by a person skilled in the art.

Figure 9:
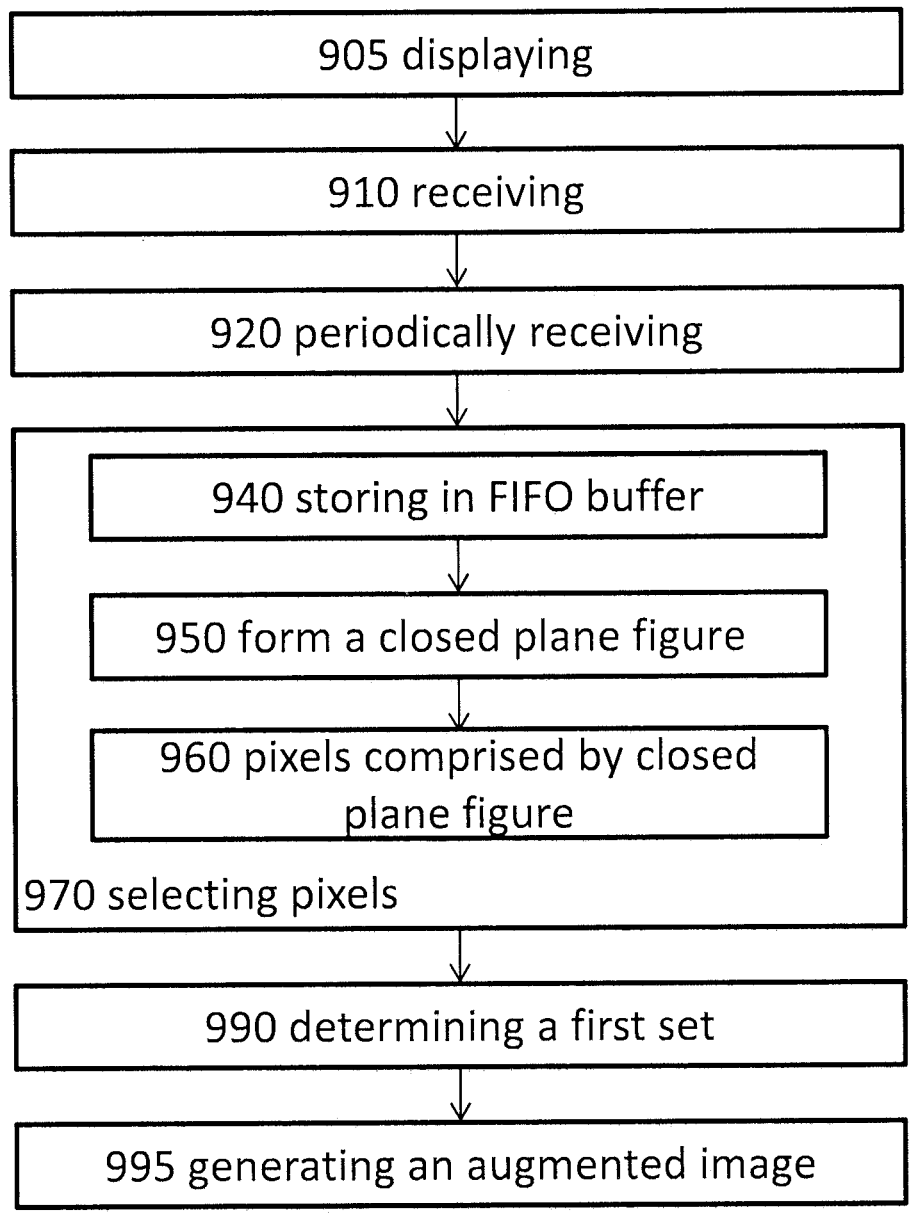
FIG. 9 shows a flowchart of a computer-implemented method for generating an augmented image in accordance with another embodiment of the present disclosure.

FIG. 9 a flowchart of another embodiment of the method described in relation to FIG. 6. The method illustrated in FIG. 9 may comprise:

at block 905, displaying an image on a display, wherein the image comprises image data values representing radiation emitted from an observed real world scene;

at block 910, receiving a user indication indicating a local area of interest as a user input signal via an input device;

at block 920, periodically receiving first data representing a press-and-rub gesture current location until it is detected that fourth data representing a press-and-rub gesture ending location is generated;

at block 970, selecting pixels in said displayed image dependent on said press-and-rub gesture current location;

at block 990, determining a first set of selected pixels representing an local area of interest in an displayed image based on said user input signal, and determining a second set of selected pixels representing remaining pixels in said image excluded from said first set of selected pixels; and at block 995, generating an augmented image by performing a first image processing operation on said first set of selected pixels and/or performing a second image processing operation on said second set of selected pixels, wherein said selecting pixels in said displayed image at block 970 further comprises storing said periodically received press-and-rub gesture current locations as entries in a first in first out (FIFO) buffer at block 940, determining that locations represented in the entries of the FIFO buffer form a closed plane figure at block 950, determining which pixels in said displayed image have displayed locations that are comprised by said closed plane figure at block 960, and selecting said determined pixels in said displayed image.

The selection of pixels by closed plane figure as described above may also be referred to as lassoing or selection by a lasso. Also, although this example refers to a FIFO buffer, it should be appreciated that other suitable data structures to keep track of a series of data (e.g., a series of press-and-rub gesture current locations) may be utilized. Thus, the FIFO buffer above should be understood to represent any suitable implementation of such data structure.

In one non limiting example, a touch screen is displaying an image, such as an IR image, and a user makes a press-and-rub gesture by pressing, holding and moving his finger over a local area of interest, whereby the press-and-rub gesture current location is detected by the touchscreen and sent as first data in the form of a user input signal to a processor in the computer system. The processor stores said press-and-rub gesture current location as an entry in a first in first out (FIFO) buffer as a data structure in memory, determines that entries in the FIFO buffer form a closed plane figure and selects pixels in said displayed image dependent on said closed plane figure e.g. by selecting image pixels within a circle formed by consecutive press-and-rub gesture current locations.

Image Processing, Applying a Predetermined Palette and a Predetermined Relation

Figure 10:
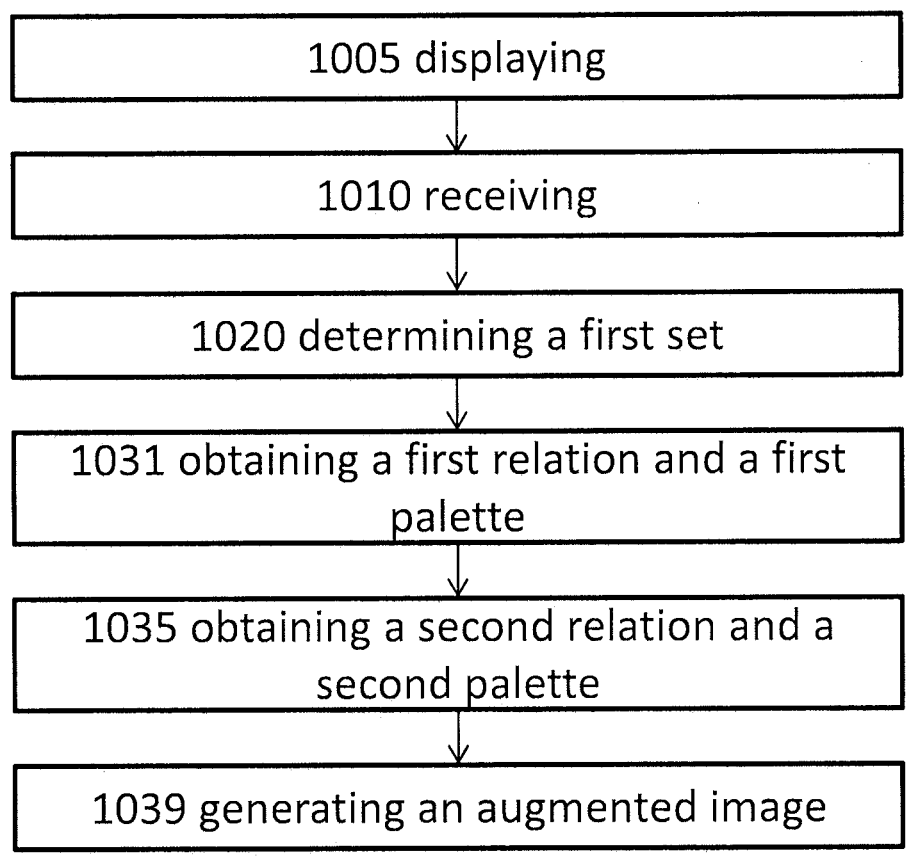
FIG. 10 shows a flowchart of a computer-implemented method for generating an augmented image in accordance with another embodiment of the present disclosure.

FIG. 10 shows a flowchart of another embodiment of the methods described in relation to FIG. 5 through FIG. 9. Blocks 1005, 1010, and 1020 are similar to corresponding blocks in FIG. 5 through FIG. 9. For example, in various embodiments illustrated by FIG. 10, operations of blocks 505, 605, 705, 805, or 905 may be performed at block 1005, operations of blocks 510, 610-630, 710-740, 810-840, or 910-970 may be performed at block 1010, and operations of blocks 520, 640, 750, 850, or 990 may be performed at block 1020 with appropriate modification.

In the method illustrated in FIG. 10, the first image processing operation is based on a second pre-determined relation and a second pre-determined palette, and the second image processing operation is based on a first pre-determined relation and a first pre-determined palette, wherein said first pre-determined relation describes a mapping from image data values to said first pre-defined palette, and wherein the first pre-defined palette represents a set of grayscale or color values of a color model displayable on a display associated with corresponding palette index values, thereby making it visible to the human eye. The method may further comprise:

at block 1031, obtaining a first pre-determined relation and a first pre-determined palette;

at block 1035, obtaining a second pre-determined relation and a second pre-determined palette; and at block 1039, generating an augmented image by performing a first image processing operation on said first set of selected pixels and/or performing a second image processing operation on said second set of selected pixels, wherein said first image processing operation comprises applying said second pre-determined relation and said second pre-determined palette to said first set of selected pixels, and wherein said second image processing operation comprises applying said first pre-determined relation and said first pre-determined palette to said second set of selected pixels.

When referring to FIGS. 11 through 14 below, description may be omitted for blocks that are similarly numbered (e.g., having the same last two digits) as blocks 1005, 1010, and 1020, but should be understood include operations that are similar to (e.g., with appropriate modifications for the applicable embodiments) those described for the earlier similarly numbered blocks.

Figure 11:
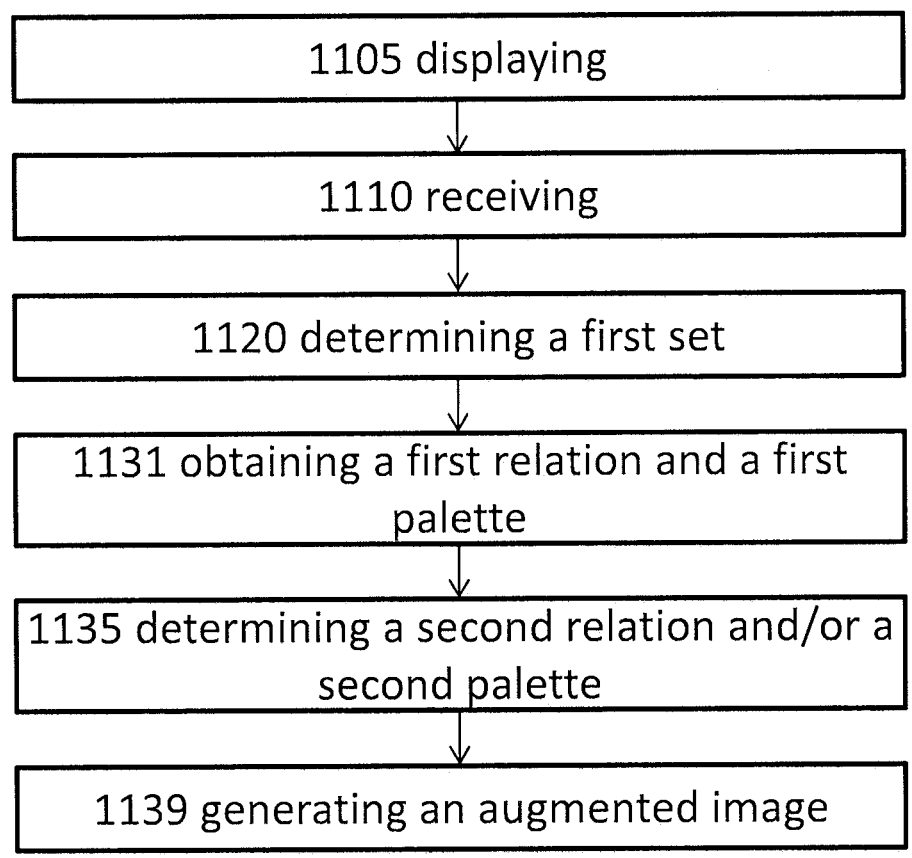
FIG. 11 shows a flowchart of a computer-implemented method for generating an augmented image in accordance with another embodiment of the present disclosure.

Image Processing, Applying a Dynamically Determined Relation and/or a Dynamically Determined Palette FIG. 11 shows a flowchart of another embodiment of the method described in relation to FIG. 5 through FIG. 9. Blocks 1105, 1110, and 1120 are similar to corresponding blocks in FIG. 5 through FIG. 9. In the method illustrated in FIG. 11, the first image processing operation is based on a second determined (e.g., dynamically determined) relation and a second pre-determined or determined (e.g., dynamically determined) palette, and the second image processing operation is based on a first pre-determined relation and a first pre-determined palette, wherein said first pre-determined relation describes a mapping from image data values to said first pre-defined palette, and wherein the first pre-defined palette represents a set of grayscale or color values of a color model displayable on a display associated to corresponding palette index values, thereby making it visible to the human eye. The method may further comprise:

at block 1131, obtaining a first pre-determined relation and a first pre-determined palette;

at block 1135, determining a second relation and/or a second palette based on said IR image data values of said first set of selected pixels in the first image;

at block 1139, generating an augmented image by performing a first image processing operation on said first set of selected pixels and/or performing a second image processing operation on said second set of selected pixels, wherein said first image processing operation comprises applying said second determined relation and said second pre-determined or determined (e.g., dynamically determined at block 1135) palette to said first set of selected pixels, and wherein said second image processing operation comprises applying said first pre-determined relation and said first pre-determined palette to said second set of selected pixels.

In one or more embodiments, the second determined relation may be different from the first pre-determined relation, and/or the second pre-determined determined palette may be different from the first pre-determined palette.

In an exemplary embodiment, said first pre-determined relation and first pre-determined palette are obtained by the processor/processing unit 112/212, comprised in the computer system 110, e.g. a thermal imaging device, or comprised in said computing device 230, from a memory 115/215 or any other computer-readable storage media known per se (e.g., in one or more conventional ways as would be understood by one skilled in the art).

Figure 12:
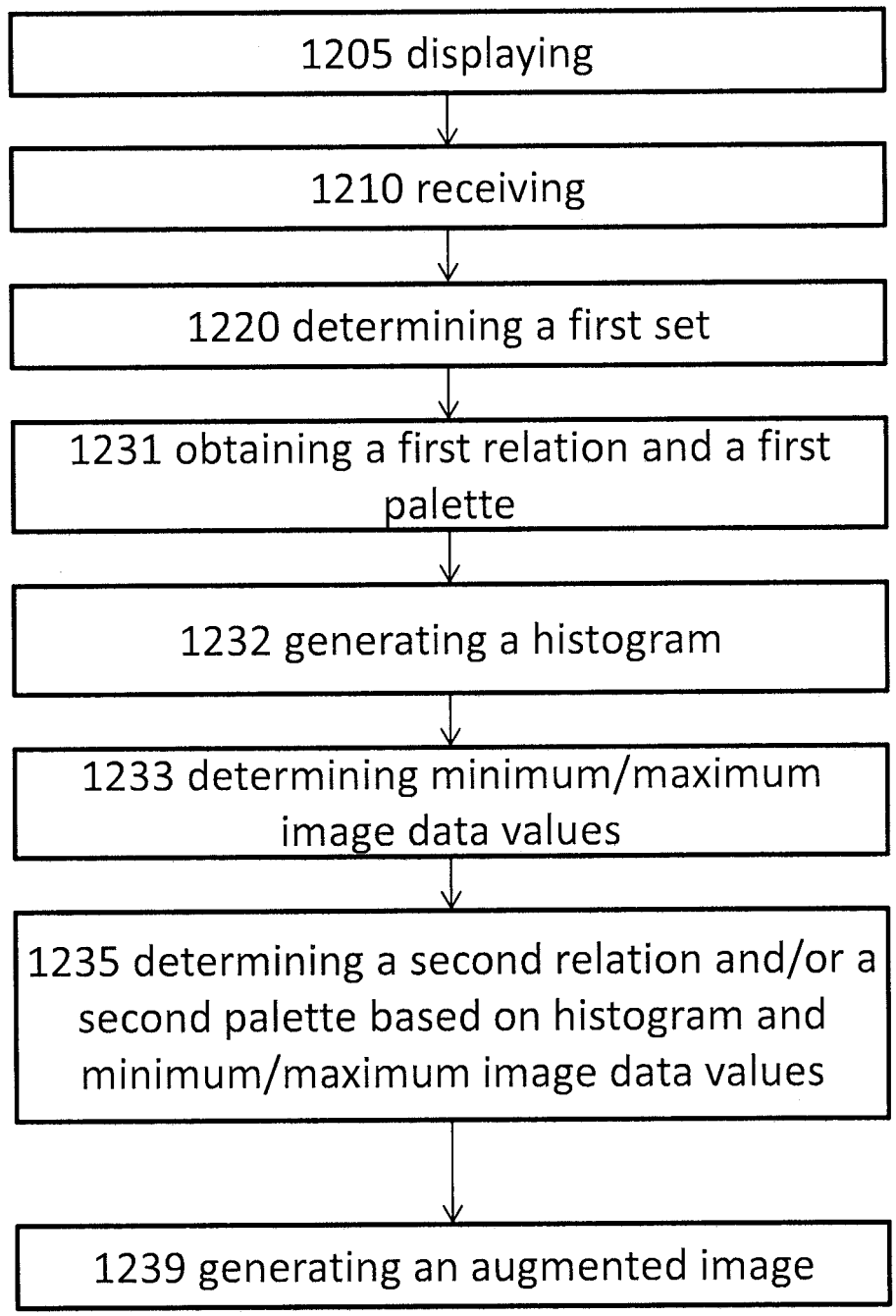
FIG. 12 shows a flowchart of a computer-implemented method for generating an augmented image in accordance with another embodiment of the present disclosure.

FIG. 12 shows a flowchart of another embodiment of the method described in relation to FIG. 11. Blocks 1205, 1210, and 1220 are similar to corresponding blocks in FIG. 5 through FIG. 9. The method illustrated in FIG. 12 may further comprise:

at block 1232, generating a histogram based on said image data values of said first set of selected pixels in the image;

at block 1233, determining based on said generated histogram minimum/maximum image data values, also referred to as color span, for which said second relation is applied; and at block 1235, determining the second relation based on said generated histogram and said determined minimum/maximum image data values.

Blocks 1231 and 1239 may respectively include operations similar to (e.g., with appropriate modifications for the applicable embodiments) blocks 1131 and 1139 of FIG. 11.

In one non-limiting example, image data values within the minimum/maximum image data values are mapped to greyscale or colors via a palette.

In one or more embodiments, the second relation is determined as a linear relation based on said minimum/maximum image data values.

In one or more embodiments, the second relation is determined as a non-linear relation based on said minimum/maximum IR image data values. In a non-limiting example embodiment, said non-linear relation is one of an exponential relation or a sinusoidal relation.

Figure 13:
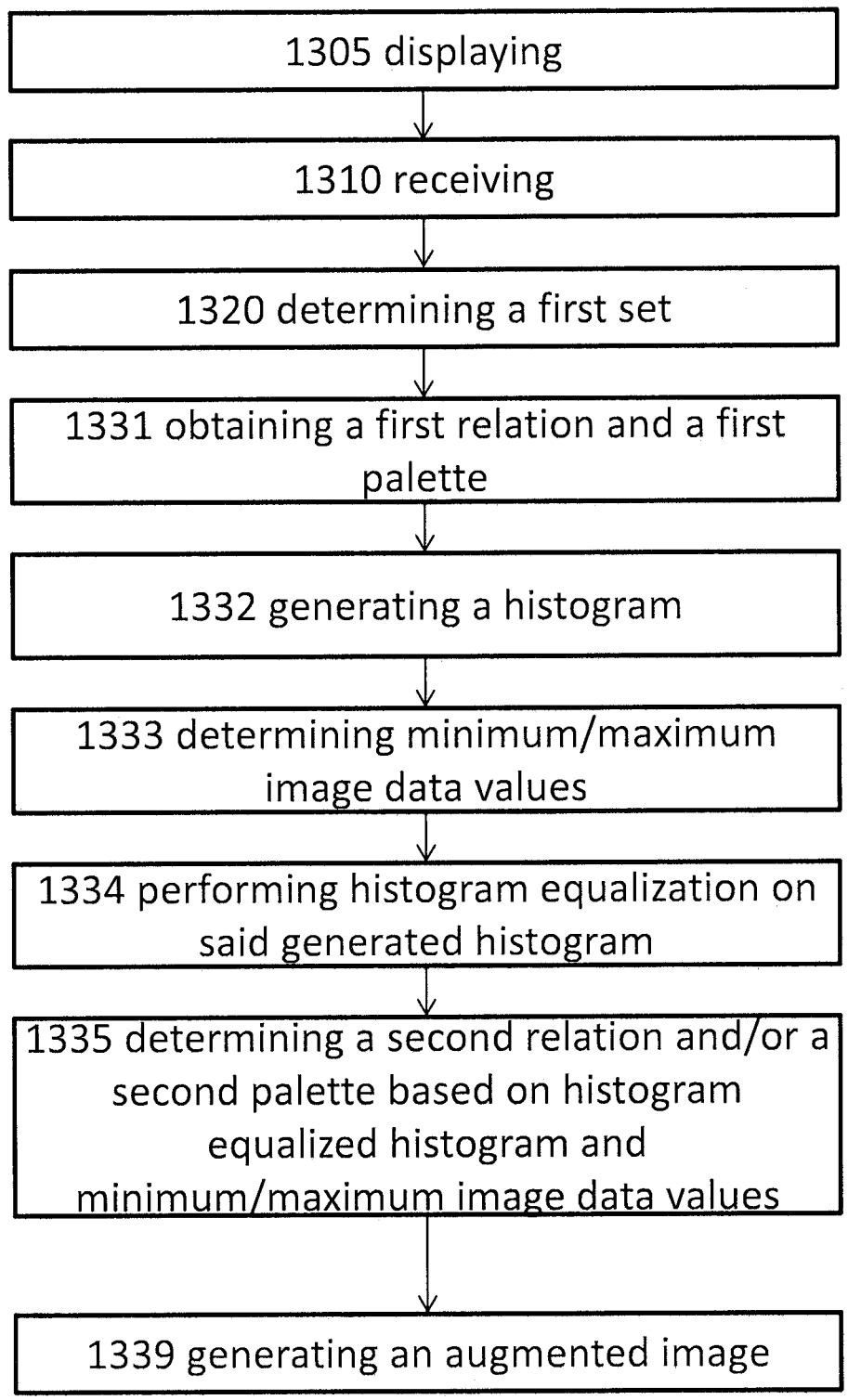
FIG. 13 shows a flowchart of a computer-implemented method for generating an augmented image in accordance with another embodiment of the present disclosure.

FIG. 13 shows a flowchart of another embodiment of the method, described in relation to FIG. 11. Blocks 1305, 1310, and 1320 are similar to corresponding blocks in FIG. 5 through FIG. 9. The method illustrated in FIG. 13 may further comprise:

at block 1332, generating a histogram based on said image data values of said first set of selected pixels in the image;

at block 1333, determining based on said generated histogram minimum/maximum image data values, also referred to as color span, for which said second relation is applied;

at block 1334, performing histogram equalization on said generated histogram; and at block 1335, determining the second relation based on said equalized histogram and said determined minimum/maximum IR image data values.

Blocks 1331 and 1339 may respectively include operations similar to (e.g., with appropriate modifications for the applicable embodiments) blocks 1131 and 1139 of FIG. 11.

Histogram equalization may be performed according to any method known in the art, as would be understood by a person skilled in the art.

Figure 14:
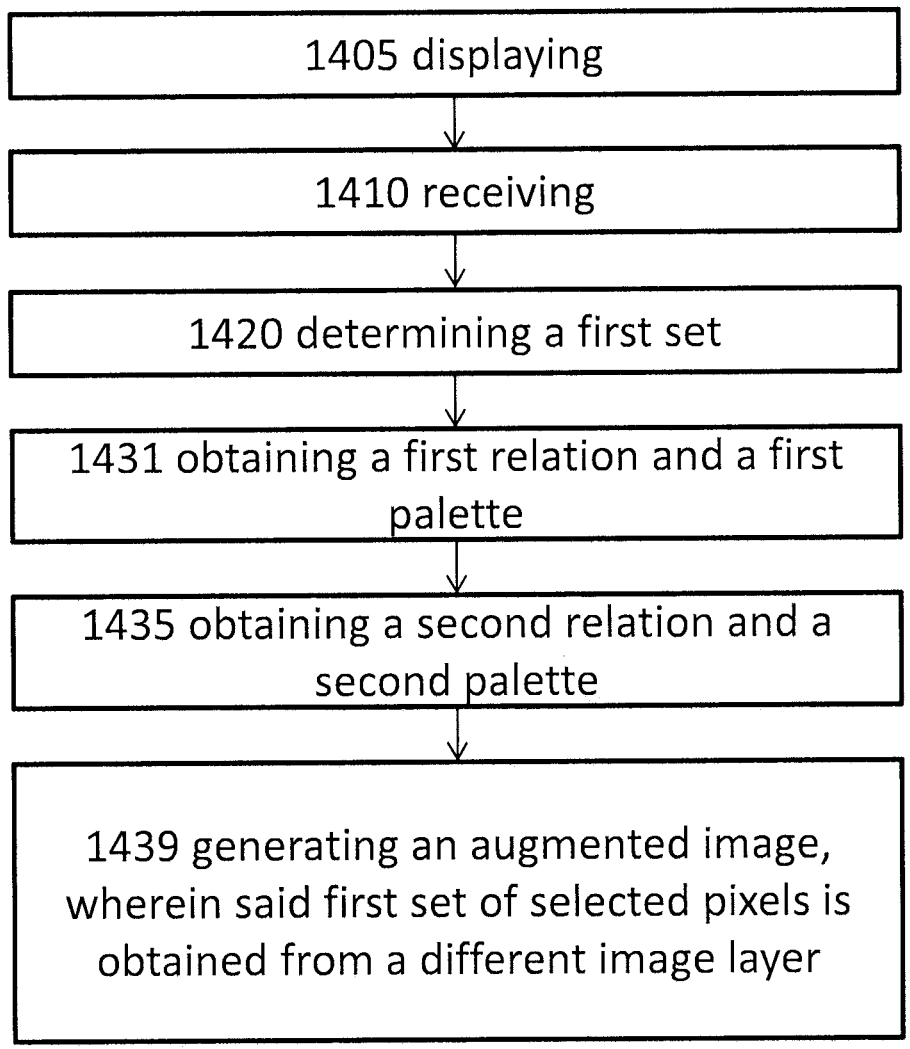
FIG. 14 shows a flowchart of a computer-implemented method for generating an augmented image in accordance with another embodiment of the present disclosure.

Image Processing, Applying a Pre-Determined Relation and a Pre-Determined Palette on Pixels Obtained from a Different Image Layer FIG. 14 shows a flowchart of another embodiment of the method described in relation to FIG. 5 through FIG. 9. Blocks 1405, 1410, and 1420 are similar to corresponding blocks in FIG. 5 through FIG. 9. In the method illustrated in FIG. 14, the first image processing operation is based on a second pre-determined relation and a second pre-determined palette, and the second image processing operation is based on a first pre-determined relation and a first pre-determined palette, wherein said first pre-determined relation describes a mapping from image data values to said first pre-defined palette, thereby making it visible to the human eye. The method may further comprise:

at block 1431, obtaining a first pre-determined relation and a first pre-determined palette;

at block 1435, obtaining a second pre-determined relation and a second pre-determined palette; and at block 1439, generating an augmented image by performing a first image processing operation on said first set of selected pixels and/or performing a second image processing operation on said second set of selected pixels, wherein said first image processing operation comprises applying said second determined relation and said second pre-determined or determined palette to said first set of selected pixels, wherein said second image processing operation comprises applying said first pre-determined relation and said first pre-determined palette to said second set of selected pixels, and wherein said first set of selected pixels is obtained from a different image layer compared to the second set of pixels.

In one non-limiting example, the user is viewing a displayed IR image and indicating a local area of interest by scratching the touchscreen with a press-and-rub gesture. In this example, the first image processing operation comprises obtaining image data values from a different image layer, e.g. a VL image layer, and applying said second determined relation and said second pre-determined or determined palette to said first set of selected pixels.

Use Case Embodiments

Figure 15:
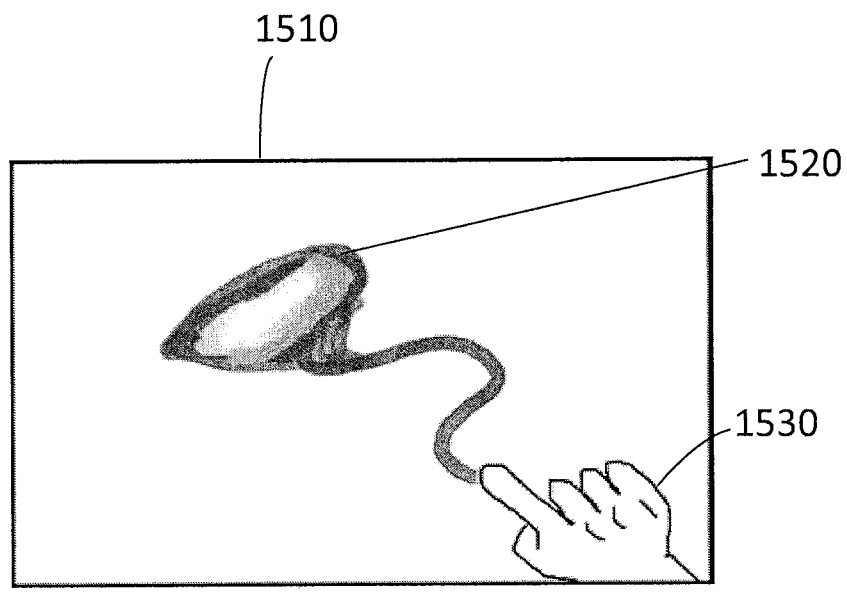
FIG. 15 illustrates how a user indicates a local area of interest in an image, according to an embodiment of a computer-implemented method of the present disclosure.

FIG. 15 illustrates how a user 1530 may indicate a first local area of interest 1520 in an image 1510, according one or more embodiments of a computer-implemented method for generating an augmented image. As shown in FIG. 15, the user 1530 can indicate in the image 1510 the first local area 1520 comprising a subset of pixels of the image 1510 as pixels of interest to the user 1530 in said image 1510. According to different embodiments, the user 1530 is able to use at least one finger or for example stylus in connection to a displayed image to perform the steps and functions of various embodiments of the method described herein via a graphical user interface. Said finger may be used to select a local area of interest by marking the region or filling in the region in a displayed IR image. According to one or more embodiments, the display on which the image is displayed is a touch sensitive display. In such embodiments, the input device, such as a stylus or a finger that is placed in contact with or in close proximity to the touch sensitive display can be used to mark or paint the area of interest. In FIGS. 16a to 16b, examples of selective presentation of combined image data using interaction tools are illustrated, according to various embodiments of the disclosure.

FIG. 16a illustrates an example display of a non-augmented image, e.g. a visual representation of IR image data values representing infrared radiation emitted from an observed real world scene and comprised in a captured infrared (IR) image.

FIG. 16b illustrates an example display of an augmented image, e.g. a visual representation of IR image data values representing infrared radiation emitted from an observed real world scene and comprised in a captured infrared (IR) image according to one or more embodiments of the disclosure, wherein pixels representing a local area of interest 1602 are displayed using a second pre-determined relation and a second pre-determined palette and the remaining pixels are displayed using a first pre-determined relation and said first pre-determined palette, thereby enabling enhanced contrast of local area of interest in the first image.

In the example illustrated in FIG. 16a, the user is presented with a thermal image into which the user may select to introduce a local contrast in a local area of interest thus making large painted areas stand out more and display details more clearly within said local area. The example illustrated in FIG. 16b is generated according to various embodiments of the present disclosure, utilizing at least one coloring method that uses divergent color and uses palette with one color tint and a maximized luminance ramp.

Figure 17:
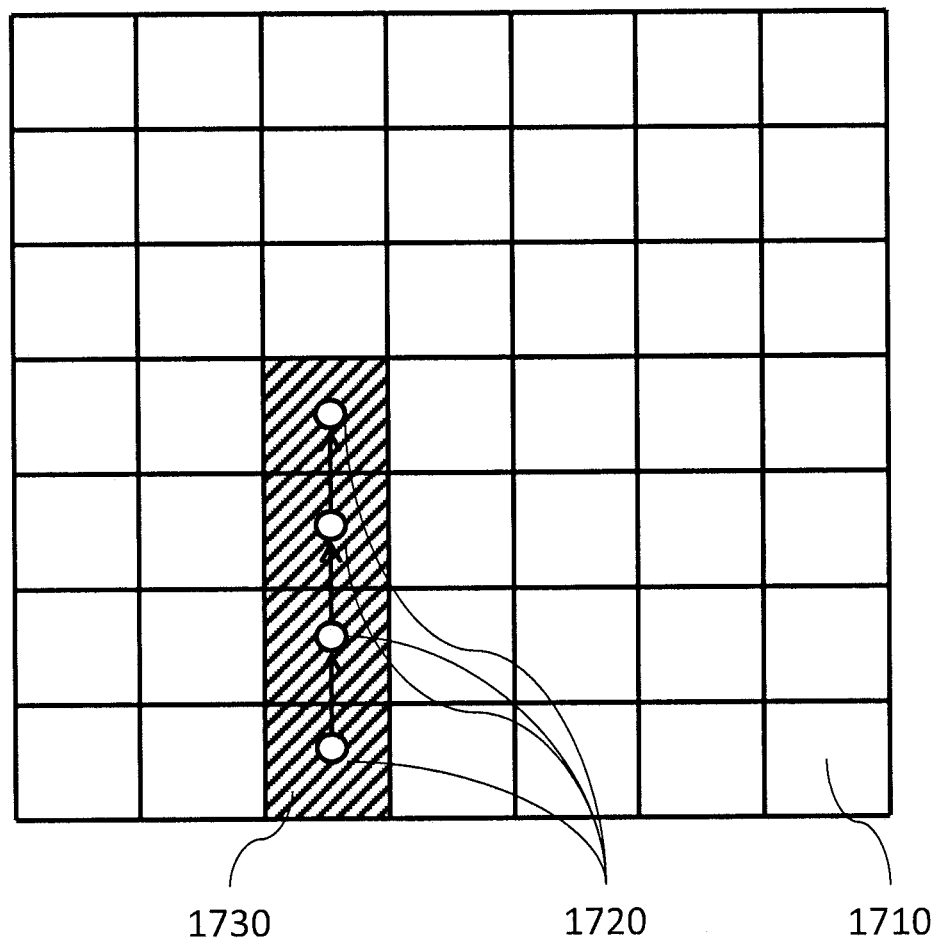
FIG. 17 illustrates how pixels are selected based on a press-and-rub gesture current location in a displayed image, in accordance with an embodiment of a computer-implemented method of the present disclosure.

FIG. 17 illustrates an example of how pixels may be selected according to an embodiment of the method described in relation to FIG. 7, wherein selecting pixels in said displayed image further comprises determining which pixels in said displayed image 1710 have displayed locations that correspond to said periodically received press-and-rub gesture current locations 1720 and selecting said determined pixels 1730.

Figure 18:
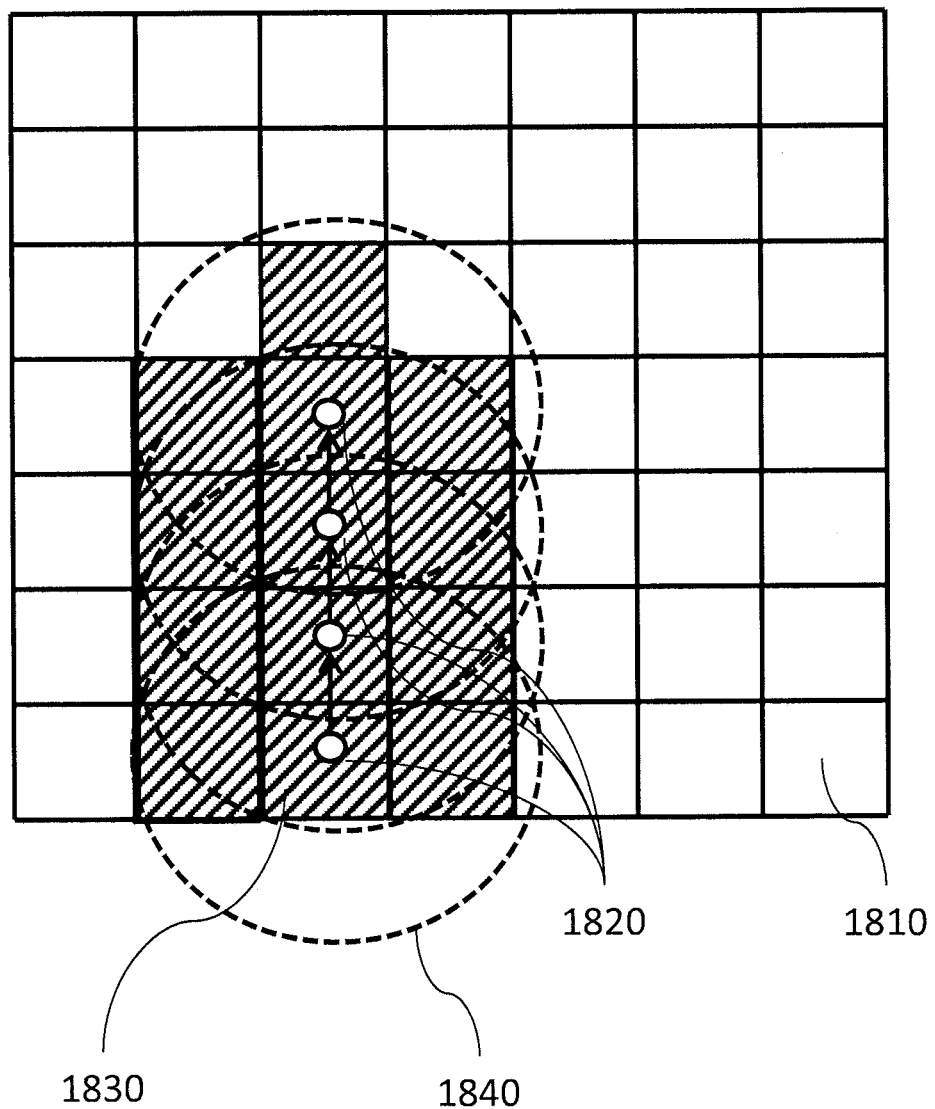
FIG. 18 illustrates how pixels are selected based on a predefined graphical object centered on a press-and-rub gesture current location in a displayed image, in accordance with an embodiment of a computer-implemented method of the present disclosure.

FIG. 18 illustrates an example of how pixels may be selected according to an embodiment of the method described in relation to FIG. 8, wherein selecting pixels in said displayed image 1810 further comprises determining which pixels in said displayed image have displayed locations that are comprised in one or more predefined graphical objects 1840 each centered on the respective press-and-rub gesture current locations 1820, and selecting said determined pixels 1830.

In one non limiting example, a touch screen is displaying an image, such as an IR image, and a user makes a press-and-rub gesture by pressing, holding and moving his finger over a local area of interest, whereby the press-and-rub gesture current location is detected by the touchscreen and sent as first data in the form of a user input signal to a processor in the computer system. The processor then determines that the predefined graphical object centered on said press-and-rub gesture current location corresponds to pixels in the displayed image and selects said corresponding image pixels, e.g. image pixels within a circle.

Figure 19:
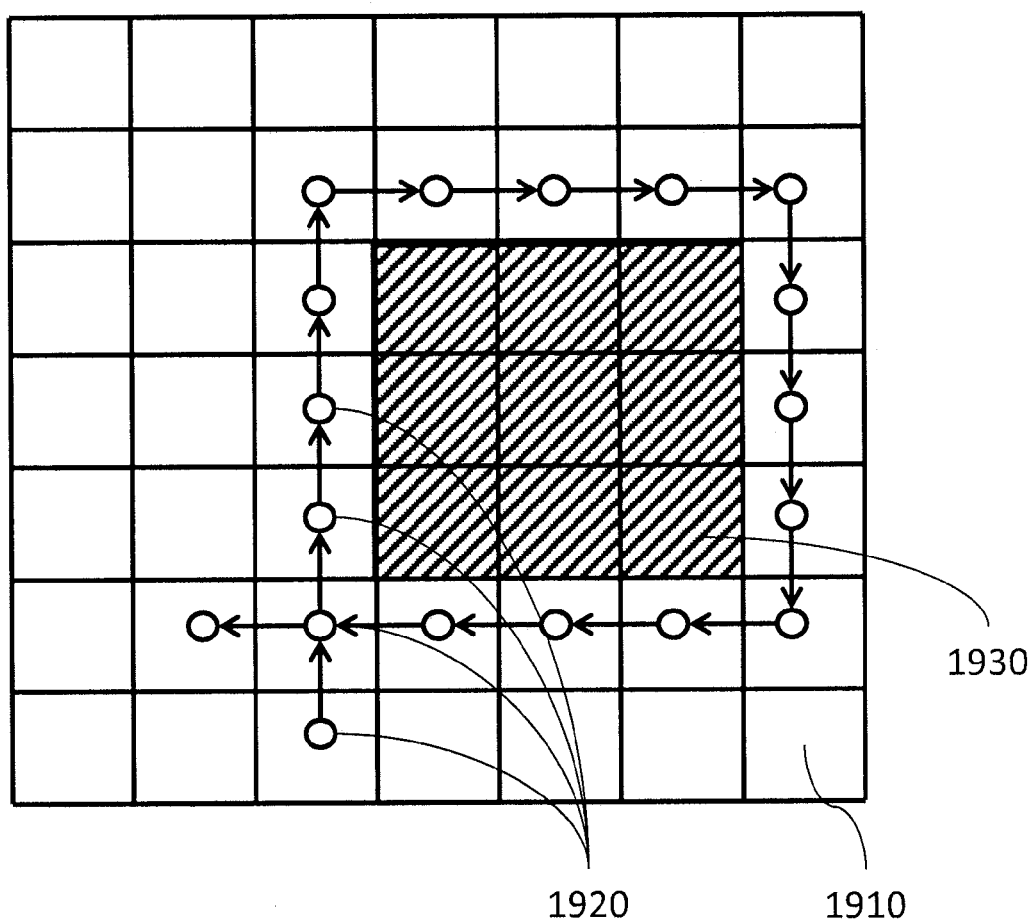
FIG. 19 illustrates how pixels are selected based on a closed plane figure formed by a press-and-rub gesture in a displayed image, in accordance with an embodiment of a computer-implemented method of the present disclosure.

FIG. 19 illustrates an example of how pixels may be selected according to an embodiment of the method described in relation to FIG. 9, wherein selecting pixels in said displayed image further comprises storing said periodically received press-and-rub gesture current locations 1920 as entries in a first in first out (FIFO) buffer, determining that locations represented in the entries of the FIFO buffer form a closed plane figure, determining which pixels in said displayed image have displayed locations that are comprised in said closed plane figure, and selecting said determined pixels 1930 in said displayed image 1910. Determining that locations represented in the entries of the FIFO buffer form a closed plane figure may comprise determining that a press-and-rub gesture current location is revisited during the same press-and-rub gesture.

In some situations, a user analyzing an image, such as an IR image, may indicate a local area of interest where an outline of a local area of interest may be identified with the currently performed image processing but no details within the outline may be identified. By allowing the user to draw a polygon or closed plane figure, e.g. a circle, triangle or square, pixels enclosed in the polygon or closed plane figure may be selected. Typically, such a polygon is bounded by a finite chain of straight-line segments closing in a loop to form a closed chain or circuit, as would be understood by a person skilled in the art.

According to an embodiment, the user may be enabled to change the settings of the presented image, to adjust the palette used for display of a local area in an IR image. This may for example be enabled by a slider or other input/interactive controller included in the interaction possibilities, with a graphical representation (not shown in the figures) in the graphical user interface.

According to alternative embodiments, the user is presented with a visual light image, an IR image or a combined visual light and IR image. In the presented image, the user is enabled to select a region of interest that is to be kept intact, while the remaining parts of the presented image is replaced by visual light image data, IR image data or a combination of visual light and IR image data, depending on the settings of the computer system, settings of the display and/or selections made by the user. For instance, a user may select, in an IR image or a combined visual light and IR image, a region of interest based on the thermal, or IR, information seen in the image. Such a region of interest may e.g. correspond to a hot spot on a switch gear, a wet, or cold, spot on a floor or a wall indicating for instance moist or poor isolation, or any other thermal information of interest to an investigation of a scene. After the region of interest is selected in the presented image, by a user using one or more interactive tools available via a graphical user interface displayed in connection with the presented image, a combined image is generated in which the part of the image that is not comprised in the selected region is replaced by visual light image data, IR image data or a combination of visual light and IR image data, depending on the settings of the computer system, settings of the display and/or selections made by the user. In the generated image, the information in the selected region is left unchanged, meaning that it is presented in the same form as in the originally presented image.

It should be appreciated that the user is enabled to select a region of interest, by using one or more fingers, to be of any shape or size within the boundaries, or area, of the image presented to the user in the graphical user interface. Thus, a user may select, in a presented visual light image or combined, blended or fused visual light and IR image, by using one of the available interaction movement, a region of interest that corresponds with one or more objects visible in the presented image and/or corresponding to one or more physical objects present in the imaged observed real world scene. Alternatively, a user may select, in a presented IR image or combined, blended or fused visual light and IR image, by using one of the available interaction tools, a region of interest corresponding to a temperature pattern of interest, such as e.g. a hot spot or a cold spot. Alternatively, the user may select, in a presented IR image, visual light image or combined, blended or fused visual light and IR image, a region of interest that does not correspond to any particular object or temperature pattern, comprising information that the user is interested in highlighting or suppressing in the image.

In an example use case of an embodiment, a user of a handheld thermal, or IR, imaging device aims the thermal, or IR, imaging device at target scene, wherein for instance malfunction of an electrical component leading to overheating of the component is suspected.

While aiming the computer system no, e.g. a thermal imaging device, at the observed real world scene, the user is typically presented with an image of the target scene on a display 118/218 integrated in or coupled to the computer system, or IR, imaging device. If the imaging device is a video imaging device, the image presentation will be updated every frame, in real time or near real time.

In an alternative exemplifying use case of an embodiment, a thermal, or IR, imaging device is mounted at a fixed location with the purpose of monitoring an imaged scene over time, by capturing still pictures of the imaged scene at predetermined time intervals, or by capturing a continuous image frame sequence such as a video sequence of the imaged scene.

Relating to all embodiments described above the image presented to the user, the image either being a real-time image of an observed scene or an image retrieved from a storage at a later time, may be a visual light image captured by a visual light imaging system 114 of the computer system no, e.g. a thermal imaging device, an IR image captured by an IR imaging system 113 of the computer system 110, e.g. a thermal imaging device, or a combined image comprising image information from both the visual light image and the IR image. The combination of image information may be performed through overlaying, blending of fusing techniques known in the art.

Image Stabilization and Alignment

Optionally, stabilization and alignment of multiple captured images are performed before a combined image is generated.

In the image stabilization, the IR image layer is either stabilized with respect to the visual light image layer, or the visual light image layer is stabilized with respect to the IR image layer, to compensate for movements of the thermal, or IR, imaging device etc. The image stabilization and alignment may be performed according to any method known in the art.

According to the embodiments wherein an IR imaging system and a visual imaging system are used to capture images of the same real world scene, the optical axes between the imaging components are typically at a distance from each other and an optical phenomenon known as parallax will arise, causing parallax related pixel displacement between the images captured with different imaging systems.

According to embodiments, the processor 112/212 is adapted to combine visual light image data with IR image data in order to generate a combined image. The combination method performed by the processor 112/212 may for instance comprise overlaying of image data, blending and/or fusion. Depending on the content of the imaged scene and what kind of information a user intends to obtain from the image, different combination methods may be preferable. To eliminate the parallax related errors the images that are to be combined/fused/blended are preferably aligned.

According to an embodiment, the user can save the final combined image or any of the previous visual light and/or IR images corresponding to the different method steps to the memory 115 for later viewing or for transfer to another processing unit, such as a computer, for further analysis and storage.

Depending on circumstances it is possible to use the disclosed methods live, i.e. for a streamed set of images filtered and combined in real time, or near real time, for instance at 30 Hz, that can be recorded and replayed as a movie, or to use still pictures.

The most commonly used combination or fusion methods are known as threshold fusion and picture-in-picture fusion. In an example method for performing a threshold fusion of images, a visual image and an IR image of the same scene are captured. In the IR image, a temperature interval is selected and only those pixels of the image that correspond to temperatures inside the selected interval are chosen and displayed together with information data from all other pixels. The resulting combination image shows the visual image except for those areas where a temperature inside the selected interval can be detected and displays data from the IR image in these pixels instead. When performing picture-in-picture fusion, a visual image and an IR image showing the same scene comprising one or more objects are captured, and the pixels inside a predetermined area, often in the form of a square, are displayed from the IR image while the rest of the combined image is shown as visual data.

In one example, to preserve the color or grey scale palette of the IR image, the generation of a combined image or image layer combination of image information comprises adding only the luminance component of high frequency content of the visual image to the IR image thereby generating a VL/IR contrast enhanced combined image. As a result, the colors are not altered and the properties of the original IR palette maintained, while at the same time adding the desired contrasts. To maintain the IR palette through all stages of processing and displaying is beneficial, since the radiometry or other relevant IR information may be kept throughout the process and the interpretation of the combined image may thereby be facilitated for the user.

According to an embodiment, the combined image is presented to the user of the computer system, such as a thermal, or IR, imaging device, on a display 118/218 comprised in, or communicatively coupled to, the computer system.

According to embodiments, the generated combined image comprises overlaid, blended and/or fused image data. If the combination method is overlaying and/or blending, the user may be enabled to control the opacity of the visual light image information and/or the IR image information. If the combined image is a fused image, the user may be enabled to control the amount of relevant information, e.g. high frequency content that is retrieved from the visual light image or the IR image and introduced into the combined image.

Further Embodiments

According to further embodiments, there is provided a computer-readable medium on which is stored non-transitory information adapted to control a processor/processing unit to perform any of the steps or functions of the invention described herein.

According to further embodiments, there is provided a computer program product comprising code portions adapted to control a processor to perform any of the steps or functions of the invention described herein Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

Advantages

According to the different embodiments above, a user is enabled to enhance the display of a local area in an IR image, in particular with regards to visible contrast or difference in temperature levels of the captured IR image. Thereby, an easily interpretable visualization of an IR image, according to settings chosen by the user, is provided.

The method according to the inventive embodiments enhances the user experience since the user's ability to view, interpret and analyze a generated IR image is improved when only relevant parts, e.g. selected by the user, are presented as enhanced display of a captured IR image.

What is claimed is:

1. A method in a computer system, the method comprising:
   receiving an infrared (IR) image comprising IR image data values within a first range, wherein the IR image data values of the IR image represent IR radiation emitted from an observed scene;
   displaying the IR image on a display at least by mapping IR image data values of the IR image to a first palette of color or grayscale representations according to a first relationship, wherein the first palette comprises a first finite set of color or grayscale representations selected from a color model, and wherein the first relationship defines mappings from different IR image data values within the first range to different color or grayscale representations in the first finite set;
   receiving, as a user input signal via an input device, a user indication indicating a local area of interest in the displayed IR image;
   determining a first portion of the IR image corresponding to pixels selected from the IR image to represent the local area of interest in the displayed IR image based on the user input signal;
   determining minimum and maximum IR image data values in the first portion of the IR image;
   determining a second palette comprising a second finite set of color or grayscale representations selected from the color model and a second relationship that defines mappings from different IR image data values within a second range to different color or grayscale representations in the second finite set based on the minimum and maximum IR image data values of the first portion of the IR image, wherein the second range is a subset of the first range, wherein a first portion of the first finite set of color or grayscale representations and a second portion of the second finite set of color or grayscale representations are non-overlapping, wherein at least one of the first finite set or the second finite set comprises color representations, and wherein the second relationship is different from the first relationship; and
   generating an augmented image from the IR image at least by mapping the IR image data values of the first portion of the IR image to the second palette according to the second relationship and mapping the IR image data values of a second portion of the IR image that does not correspond to the local area of interest to the first palette according to the first relationship to provide improved visualization of the IR image data values within the local area of interest.

2. The method of claim 1, wherein:
   said receiving the user indication comprises:
      receiving a user input indicating an initiation of a press-and-rub gesture operation via a touch screen as the user input signal, and
      periodically receiving an additional user input, via the touch screen, representing a press-and-rub gesture current location until it is detected that the press-and-rub gesture operation is completed; and
   said determining the first portion of the IR image comprises selecting pixels in said displayed IR image based on said press-and-rub gesture current location.

3. The method of claim 2, wherein said selecting the pixels in said displayed IR image comprises:
  determining which pixels in said displayed IR image have displayed locations that correspond to said periodically received press-and-rub gesture current locations; and
  selecting said determined pixels as the first portion of the IR image.

4. The method of claim 2, wherein said selecting the pixels in said displayed IR image comprises:
  determining which pixels in said displayed IR image have displayed locations that are comprised in one or more predefined graphical object each centered on corresponding one of said periodically received press-and-rub gesture current locations; and
  selecting said determined pixels as the first portion of the IR image.

5. The method of claim 2, wherein:
  said receiving the user indication further comprises:
    storing said periodically received press-and-rub gesture current locations as entries in a first in first out (FIFO) buffer, and
    determining that locations represented in the entries of the FIFO buffer form a closed plane figure; and
  said selecting the pixels in said displayed IR image comprises:
    determining which pixels in said displayed IR image have displayed locations that are comprised in said closed plane figure, and
    selecting said determined pixels as the first portion of the IR image.

6. The method of claim 1, wherein:
  the IR image is a thermal image; and
  the method further comprises displaying the augmented image on the display.

7. The method of claim 1, further comprising:
  generating a histogram based on said IR image data values of said first portion of the IR image, wherein said minimum and maximum IR image data values are determined based on said generated histogram.

8. The method of claim 1, wherein:
  the IR image comprises a plurality of image layers each having IR image data values and/or IR information associated with the observed scene;
  the mapping according to the first relationship comprises providing image data values and/or information of a first one of the image layers for displaying; and
  the mapping according to the second relationship comprises providing image data values and/or information of a second one of the image layers for displaying.

9. The method of claim 1, further comprising determining the first relationship for mapping the IR image data values to the first palette of color or grayscale representations based on the first range.

10. A computer system for processing captured infrared (IR) image data values, said computer system comprising:
  a processor;
  a display; and
  at least one memory configured to store data values or parameters received from the processor or to retrieve and send data values or parameters to the processor;
  wherein the processor is configured to:
    receive an IR image comprising IR image data values within a first range, wherein the IR image data values of the IR image represent IR radiation emitted from an observed scene,
    display the IR image on the display at least by mapping IR image data values of the IR image to a first palette of color or grayscale representations according to a first relationship, wherein the first palette comprises a first finite set of color or grayscale representations selected from a color model, and wherein the first relationship defines mappings from different IR image data values within the first range to different color or grayscale representations in the first finite set,
    receive, as the user input signal, a user indication indicating a local area of interest in the displayed IR image,
    determine a first portion of the IR image corresponding to pixels selected to represent the local area of interest in the displayed IR image based on said user input signal,
    determine minimum and maximum IR image data values in the first portion of the IR image,
    determine a second palette comprising a second finite set of color or grayscale representations selected from the color model and a second relationship that defines mappings from different IR image data values within a second range to different color or grayscale representations based on the minimum and maximum IR image data values of the first portion of the IR image, wherein the second range is a subset of the first range, wherein a first portion of the first finite set of color or grayscale representations and a second portion of the second finite set of color or grayscale representations are non-overlapping, wherein at least one of the first finite set or the second finite set comprises color representations, and wherein the second relationship is different from the first relationship, and
    generate an augmented image from the IR image at least by mapping the IR image data values of the first portion of the IR image to the second palette according to the second relationship and mapping the IR image data values of a second portion of the IR image that does not correspond to the local area of interest to the first palette according to the first relationship.

11. The computer system of claim 10, wherein the processor is further configured to:
  receive a user input indicating an initiation of a press-and-rub gesture operation via a touch screen functionality of the display as the user input signal;
  periodically receive an additional user input, via the display, representing a press-and-rub gesture current location until it is detected that the press-and-rub gesture operation is completed; and
  select pixels in said displayed IR image based on said periodically received press-and-rub gesture current locations as part of the first portion of the IR image.

12. The computer system of claim 11, wherein the processor is further configured to:
  determine which pixels in said displayed IR image have displayed locations that correspond to said periodically received press-and-rub gesture current locations; and
  select said determined pixels as the first portion of the IR image.

13. The computer system of claim 11, wherein the processor is further configured to:
  determine which pixels in said displayed IR image have displayed locations that are comprised in one or more predefined graphical objects each centered on corresponding one of said periodically received press-and-rub gesture current locations; and select said determined pixels as the first portion of the IR image.

14. The computer system of claim 11, wherein the processor is further configured to:
store said periodically received press-and-rub gesture current locations as entries in a first in first out (FIFO) buffer in the at least one memory;
determine that locations represented in the entries of the FIFO buffer form a closed plane figure;
determine which pixels in said displayed IR image have displayed locations that are comprised in said closed plane figure; and
select said determined pixels as the first portion of the IR image.

15. The computer system of claim 10, wherein the processor is further configured to:
generate a histogram based on said IR image data values of said first portion of the IR image, wherein the minimum and maximum IR image data values are determined based on said generated histogram.

16. The computer system of claim 10, wherein:
the IR image comprises a plurality of image layers each having IR image data values and/or IR information associated with the observed scene;
the mapping according to the first relationship comprises providing image data values and/or information of a first one of the image layers for displaying; and
the mapping according to the second relationship comprises providing image data values and/or information of a second one of the image layers for displaying.

17. The computer system in claim 10, further comprising a visible light (VL) imaging system configured to capture VL image data values representing VL radiation emitted from the observed scene, wherein the augmented image comprises the VL image data values.

18. The computer system of claim 10, wherein the processor is further configured to determine the first relationship for mapping the IR image data values to the first palette of color or grayscale representations based on the first range.

19. A non-transitory computer-readable medium storing computer-readable instructions which, when executed by a processor of a computer system, cause the computer system to perform a method comprising:
receiving an infrared (IR) image comprising IR image data values within a first range, wherein the IR image data values of the IR image represent IR radiation emitted from an observed scene;
displaying the IR image on a display at least by mapping IR image data values of the IR image to a first palette of color or grayscale representations according to a first relationship, wherein the first palette comprises a first finite set of color or grayscale representations selected from a color model, and wherein the first relationship defines mappings from different IR image data values within the first range to different color or grayscale representations in the first finite set;
receiving, as a user input signal via an input device, a user indication indicating a local area of interest in the displayed IR image;
determining a first portion of the IR image corresponding to pixels selected to represent the local area of interest in the displayed IR image based on said user input signal;
determining minimum and maximum IR image data values in the determined portion of the IR image;
determining a second palette comprising a second finite set of color or grayscale representations selected from the color model and a second relationship that defines mappings from different IR image data values within a second range to different color or grayscale representations in the second finite set based on the minimum and maximum IR image data values of the first portion of the IR image, wherein the second range is a subset of the first range, wherein a first portion of the first finite set of color or grayscale representations and a second portion of the second finite set of color or grayscale representations are non-overlapping, wherein at least one of the first finite set or the second finite set comprises color representations, and wherein the second relationship is different from the first relationship; and
generating an augmented image from the IR image by mapping the IR image data values of the first portion of the IR image to the second palette according to the second relationship and mapping the IR image data values of a second portion of the IR image that does not correspond to the local area of interest to the first palette according to the first relationship.

20. The non-transitory computer-readable medium of claim 19, wherein the method further comprise determining the first relationship for mapping the IR image data values to the first palette of color or grayscale representations based on the first range.

* * * * *

UNITED STATES PATENT AND TRADEMARK OFFICE
CERTIFICATE OF CORRECTION

PATENT NO. : 10,089,787 B2
APPLICATION NO. : 14/582736
DATED : October 2, 2018
INVENTOR(S) : Björn Roth Page 1 of 2

It is certified that error appears in the above-identified patent and that said Letters Patent is hereby corrected as shown below:

In the Detailed Description:

In Column 8, Line 57, change "computer system no" to --computer system 110--.

In Column 9, Line 7, change "computer system no" to --computer system 110--.

In Column 9, Lines 16 and 17, change "computer system no" to --computer system 110--.

In Column 9, Line 20, change "computer system no" to --computer system 110--.

In Column 9, Line 21, change "computer system no" to --computer system 110--.

In Column 9, Line 30, change "computer system no" to --computer system 110--.

In Column 9, Line 42, change "computer system no" to --computer system 110--.

In Column 9, Line 46, change "computer system no" to --computer system 110--.

In Column 10, Line 24, change "computer system no" to --computer system 110--.

In Column 10, Line 28, change "computer system no" to --computer system 110--.

In Column 10, Line 31, change "computer system no" to --computer system 110--.

In Column 10, Line 41, change "computer system no" to --computer system 110--.

In Column 10, Line 51, change "computer system no" to --computer system 110--.

In Column 10, Line 54, change "computer system no" to --computer system 110--.

Signed and Sealed this
Thirtieth Day of April, 2019

Andrei Iancu
*Director of the United States Patent and Trademark Office*

CERTIFICATE OF CORRECTION (continued)
U.S. Pat. No. 10,089,787 B2

In Column 10, Line 60, change "computer system no" to --computer system 110--.

In Column 10, Line 65, change "computer system no" to --computer system 110--.

In Column 11, Line 4, change "computer system no" to --computer system 110--.

In Column 11, Line 19, change "computer system no" to --computer system 110--.

In Column 12, Line 48, change "e.g," to --e.g.--.